(12) United States Patent
Chen et al.

(10) Patent No.: US 10,832,174 B1
(45) Date of Patent: Nov. 10, 2020

(54) DISTRIBUTED HYPERPARAMETER TUNING SYSTEM FOR ACTIVE MACHINE LEARNING

(71) Applicant: SAS Institute Inc., Cary, NC (US)

(72) Inventors: Xu Chen, Apex, NC (US); Brett Alan Wujek, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/816,382

(22) Filed: Mar. 12, 2020

Related U.S. Application Data

(60) Provisional application No. 62/914,790, filed on Oct. 14, 2019.

(51) Int. Cl.
  *G06N 5/04* (2006.01)
  *G06N 20/00* (2019.01)
  *G06F 16/28* (2019.01)

(52) U.S. Cl.
  CPC .......... *G06N 20/00* (2019.01); *G06F 16/285* (2019.01); *G06N 5/04* (2013.01)

(58) Field of Classification Search
  CPC ......... G06N 20/00; G06N 5/04; G06F 16/285
  USPC ....................................................... 706/46
  See application file for complete search history.

(56) References Cited

U.S. PATENT DOCUMENTS

| | | | |
|---|---|---|---|
| 9,792,562 B1 | 10/2017 | Chen et al. | |
| 10,127,477 B2 | 11/2018 | Chen et al. | |
| 10,275,690 B2 | 4/2019 | Chen et al. | |
| 10,354,204 B2 | 7/2019 | Chen et al. | |
| 10,360,517 B2 | 7/2019 | Koch et al. | |
| 10,430,690 B1 | 10/2019 | Chen | |
| 10,521,734 B2 | 12/2019 | Chen et al. | |
| 2020/0104630 A1 | 3/2020 | Chen et al. | |
| 2020/0151603 A1 | 5/2020 | Chen | |

OTHER PUBLICATIONS

Zhou et al ("Learning with Local and Global Consistency" 2004) (Year: 2004).*
Zhang et al ("Prototype Vector Machine for Large Scale Semi-Supervised Learning" 2009) (Year: 2009).*

(Continued)

*Primary Examiner* — Lut Wong
(74) *Attorney, Agent, or Firm* — Bell & Manning, LLC

(57) ABSTRACT

Data is classified using automatically selected hyperparameter values. (A) A first loss value is determined based on a converged classification matrix. (B) Each observation vector is assigned to a cluster using a clustering algorithm based on the converged classification matrix. (C) A predefined number of observation vectors is selected from each cluster. D) Classified observation vectors and unclassified observation vectors are updated based on the selections in (C) and (A) is repeated. (E) An entropy loss value is determined, wherein (A) to (E) are repeated for a plurality of different values of a kernel parameter value and a batch size value. (F) A second loss value is determined based on the converged classification matrix, a label matrix defined from the converged classification matrix, and a weight value. (L) (A) to (F) are repeated with a plurality of different values of the weight value until convergence is satisfied.

30 Claims, 26 Drawing Sheets

(56) References Cited

OTHER PUBLICATIONS

P. Koch et al, "Autotune: A Derivative-free Optimization Framework for Hyperparameter Tuning", arXiv:804.07824v2 KDD 2018.
Wikipedia: Knapsack problem, https://en.wikipedia.org/w/index.php?title=Knapsack problem&oldid=942139230, page last edited on Feb. 22, 2020.
Modeling Examples—Python-MIP documentation https://python-mip.readthedocs.io/en/latest/examples.html#the-0-1-knapsack-problem[Dec. 13, 2019 9:33:26 AM].
AutoDAL: Distributed Active Learning with Automatic Hyperparameter Selection, Anonymous Submission, Association for the Advancement of Artificial Intelligence, 2020.
C. Thornton et al "Auto-weka: Combined selection and hyperparameter optimization of classification algorithm", KDD 2013., arXiv:1208.3719v2 [cs.LG] Mar. 6, 2013.
M. Feurer et al "Efficient and Robust Automated Machine Learning", Neural Information Processing Systems (NIPS) 2015.
Y. Li, "Towards Automated Semi-supervised Learning". AAAI conference on Artificial Intelligence, 2019.
Y. Yang, "Multiclass active learning by uncertainty sampling with diversity maximization", International Journal of Computer Vision, Oct. 14, 2014.
W. Fu et al, Scalable Active Learning by Approximated Error Reduction, Research Track Paper, KDD 2018.
Deb, Kalyanmoy; Spears, William M. (1997). "C6.2: Speciation methods" from Handbook of Evolutionary Computation. Institute of Physics Publishing.

\* cited by examiner

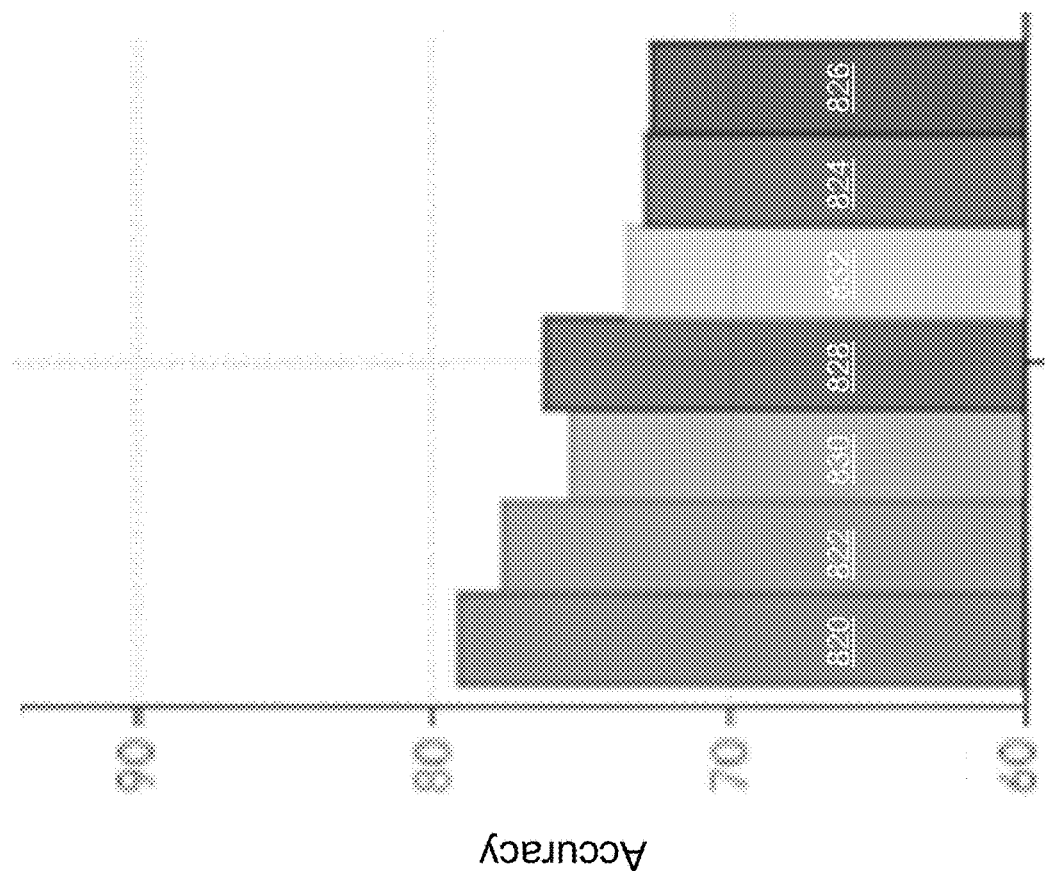
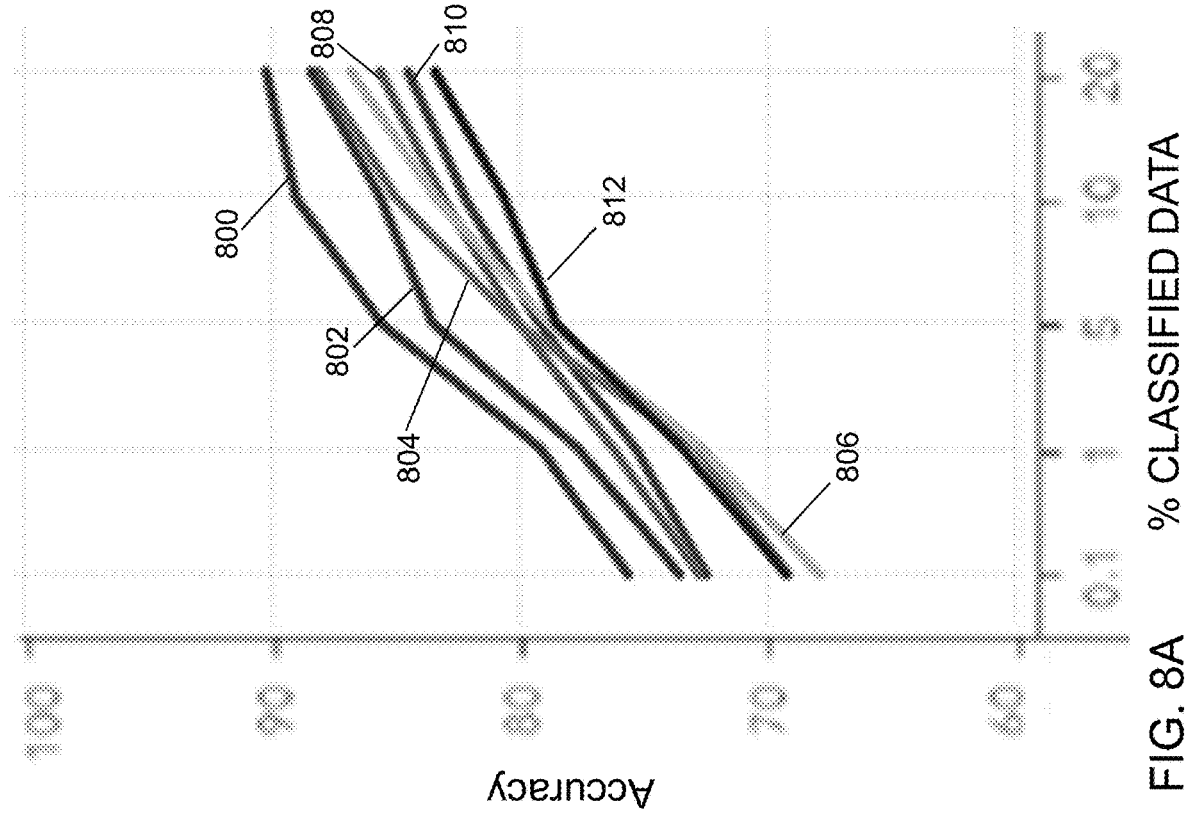
FIG. 8B
FIG. 8A

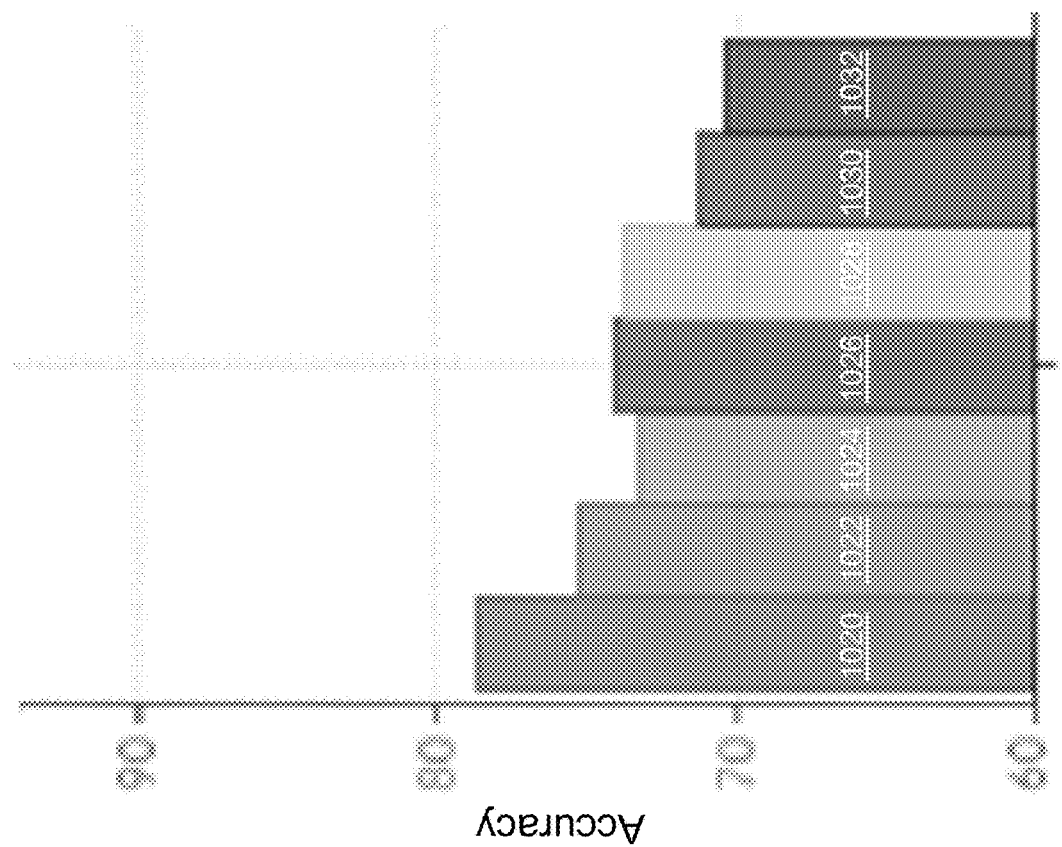
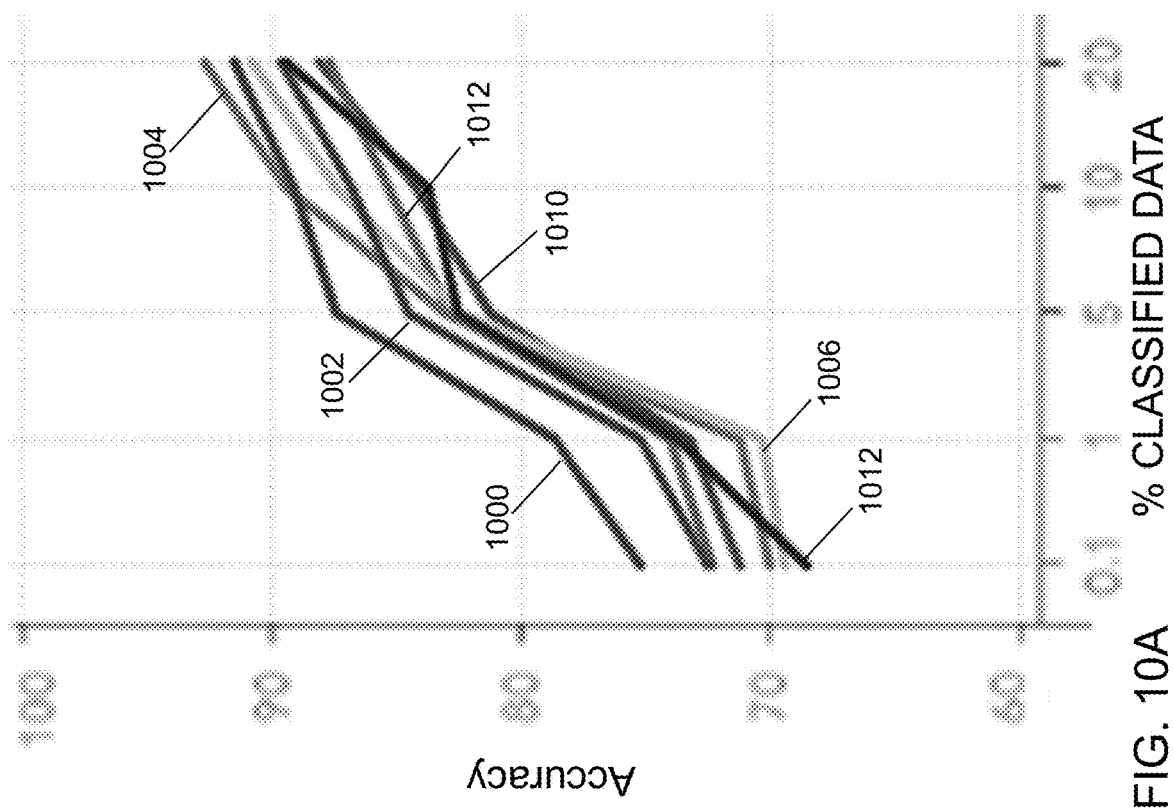
FIG. 10B
FIG. 10A

DISTRIBUTED HYPERPARAMETER TUNING SYSTEM FOR ACTIVE MACHINE LEARNING

CROSS-REFERENCE TO RELATED APPLICATIONS

The present application claims the benefit of and priority based on 35 U.S.C. § 119(e) to U.S. Provisional Patent Application No. 62/914,790 filed Oct. 14, 2019, the entire contents of which are hereby incorporated by reference.

BACKGROUND

Facilitating effective decision making requires the transformation of relevant data to high-quality classification models. Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be classified in training data to indicate occurrence or non-occurrence of the event or to recognize/classify the object. An unsupervised learning system predicts the class, target variable y, in training data by defining a model that describes hidden structure in the training data. Supervised learning requires that the target (dependent) variable y be labeled in training data so that a model can be built to predict the label of new unlabeled data. A supervised learning system discards an observation in the training data that is not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the classification (data labeling) model.

Determining hyperparameters associated with the classification model to determine the best model configuration is a complex optimization problem. Though the classification model solutions are influenced by the hyperparameters, there are typically no clear default values for the hyperparameters that generate a satisfactory classification model for a wide range of applications. Not only do the input values used for the hyperparameters dictate the performance of the training process, but more importantly they influence the quality of the resulting classification models. Even with expertise in setting the hyperparameters, the best values of these hyperparameters change with different data. As a result, it is difficult to define the hyperparameter values based on previous experience. However, there is an inherent expense in training numerous candidate models to evaluate various values and combinations of values for the hyperparameters in terms of computing resources, computing time, and user time.

SUMMARY

In an example embodiment, a non-transitory computer-readable medium is provided having stored thereon computer-readable instructions that when executed by a computing device, cause the computing device to classify data using automatically selected hyperparameter values. (A) A first loss value is determined based on a converged classification matrix computed using a plurality of observation vectors. The plurality of observation vectors includes a plurality of classified observation vectors and a plurality of unclassified observation vectors. The converged classification matrix defines a label probability for each permissible classification value of a plurality of permissible classification values for each observation vector of the plurality of unclassified observation vectors. The converged classification matrix is defined using a kernel function and a predefined kernel parameter value. Each observation vector of the plurality of classified observation vectors has one of the plurality of permissible classification values defined for a target variable. (B) Each observation vector of the plurality of observation vectors is assigned to a cluster using a clustering algorithm based on the converged classification matrix to define a plurality of clusters. (C) A predefined number of observation vectors is selected from each cluster of the defined plurality of clusters based on an entropy value computed for each observation vector of the plurality of unclassified observation vectors. The predefined number of observation vectors is based on a predefined batch size value. (D) A copy of the plurality of classified observation vectors is updated to include the observation vectors selected in (C) with a value for the target variable selected based on the label probability of each permissible classification value for each respective selected observation vector. (E) A copy of the plurality of unclassified observation vectors is updated to remove the observation vectors selected in (C). (F) (A) is repeated with the updated copy of the plurality of classified observation vectors and the updated copy of the plurality of unclassified observation vectors. (G) An entropy loss value is determined using the entropy value computed for each observation vector selected in (C), wherein (A) to (G) are repeated for a plurality of different values of the predefined kernel parameter value and the predefined batch size value. (H) A second loss value is determined based on the converged classification matrix, a label matrix defined from the converged classification matrix, and a predefined weight value. The label matrix has one of the plurality of permissible classification values defined for the target variable for each observation vector of the updated plurality of unclassified observation vectors. (I) A second number of observation vectors is selected from the plurality of unclassified observation vectors. The second number of observation vectors is determined from the different values of the predefined batch size value based on the determined first loss value, the determined entropy loss value, and the determined second loss value. (J) The plurality of classified observation vectors is updated to include the observation vectors selected in (I) with the value for the target variable selected based on the label probability of each permissible classification value for each respective observation vector selected in (I). (K) The plurality of unclassified observation vectors is updated to remove the observation vectors selected in (I). (L) (A) to (K) are repeated with a plurality of different values of the predefined weight value until convergence is satisfied. (M) The label matrix is output to classify each observation vector included in the plurality of unclassified observation vectors.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to classify data using automatically selected hyperparameter values.

In yet another example embodiment, a method of classifying data using automatically selected hyperparameter values is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 8A to 8C provide accuracy and misclassification error comparisons between multiple classification methods using a first dataset in accordance with an illustrative embodiment.

FIGS. 10A to 10C provide accuracy and misclassification error comparisons between multiple classification methods using a third dataset in accordance with an illustrative embodiment.

DETAILED DESCRIPTION

Figure 1:
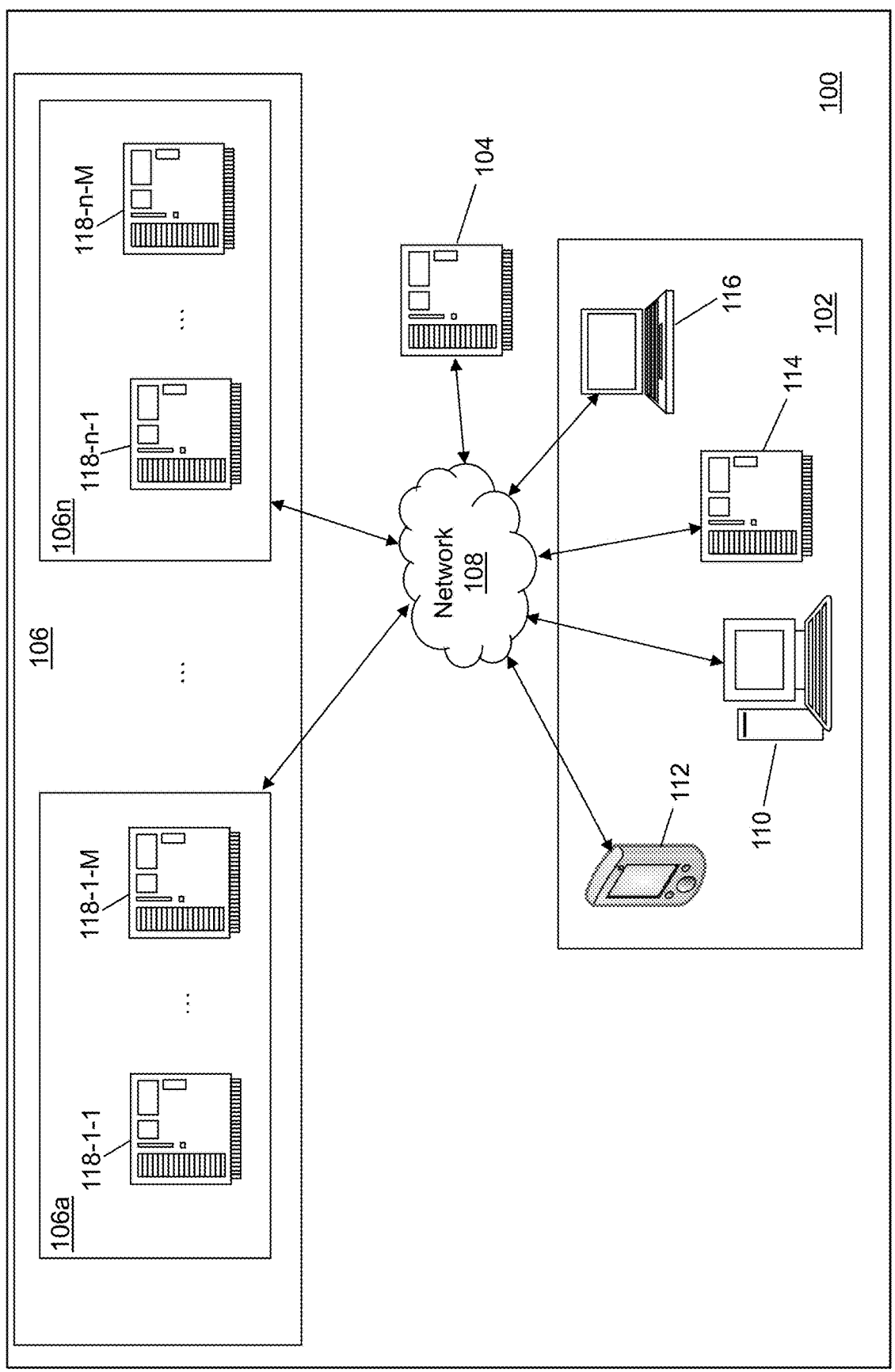
FIG. 1 depicts a block diagram of a hyperparameter selection system in accordance with an illustrative embodiment.

Referring to FIG. 1, a block diagram of hyperparameter selection system 100 is shown in accordance with an illustrative embodiment. Hyperparameter selection system 100 provides an automated, distributed active machine learning system that jointly minimizes a loss from a classification stage and a query selection stage allowing users to select hyperparameters such as a kernel bandwidth, a batch size, etc. automatically. A practical application for hyperparameter selection system 100 is an electroencephalogram signal classification with limited labeled data. Hyperparameter selection system 100 is configured to apply active learning in a distributed environment with automatic hyperparameter selection.

In an illustrative embodiment, hyperparameter selection system 100 may include a user system 102, a selection manager device 104, a worker system 106, and a network 108. Each of user system 102, selection manager device 104, and worker system 106 may be composed of one or more discrete computing devices in communication through network 108. Alternatively, user system 102, selection manager device 104, and worker system 106 may be integrated into a single computing device capable of computing using a plurality of different threads.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from selection manager device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
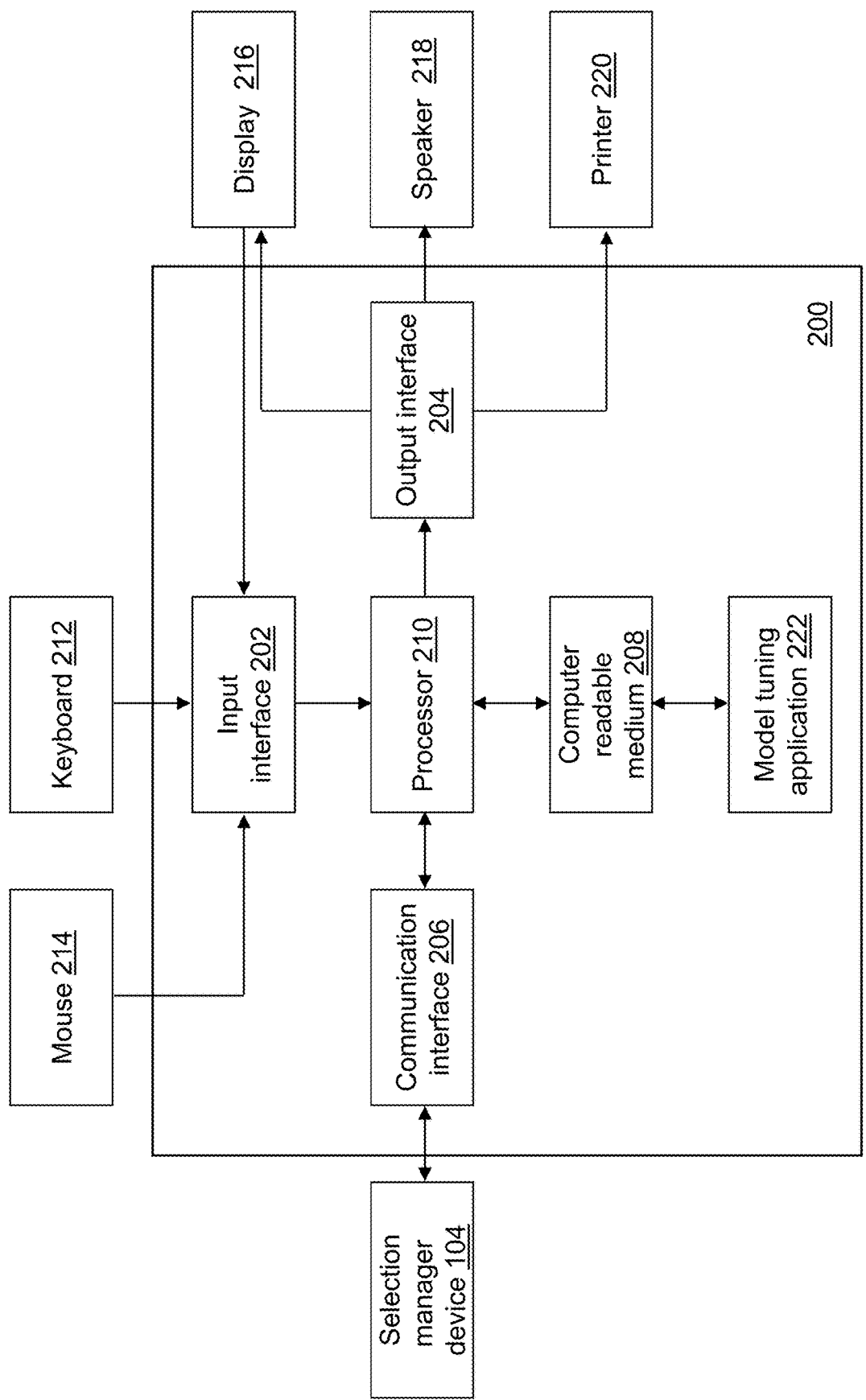
FIG. 2 depicts a block diagram of a user device of the hyperparameter selection system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a computer-readable medium 208, a processor 210, and a model tuning application 222. Each computing device of user system 102 may be executing model tuning application 222 of the same or different type.

Referring again to FIG. 1, selection manager device 104 can include any form factor of computing device. For illustration, FIG. 1 represents selection manager device 104 as a server computer. Selection manager device 104 may send and receive signals through network 108 to/from user system 102 and/or to/from worker system 106. Selection manager device 104 may communicate using various transmission media that may be wired and/or wireless as understood by those skilled in the art. Selection manager device 104 may be implemented on a plurality of computing devices of the same or different type. Hyperparameter selection system 100 further may include a plurality of selection manager devices.

Figure 3:
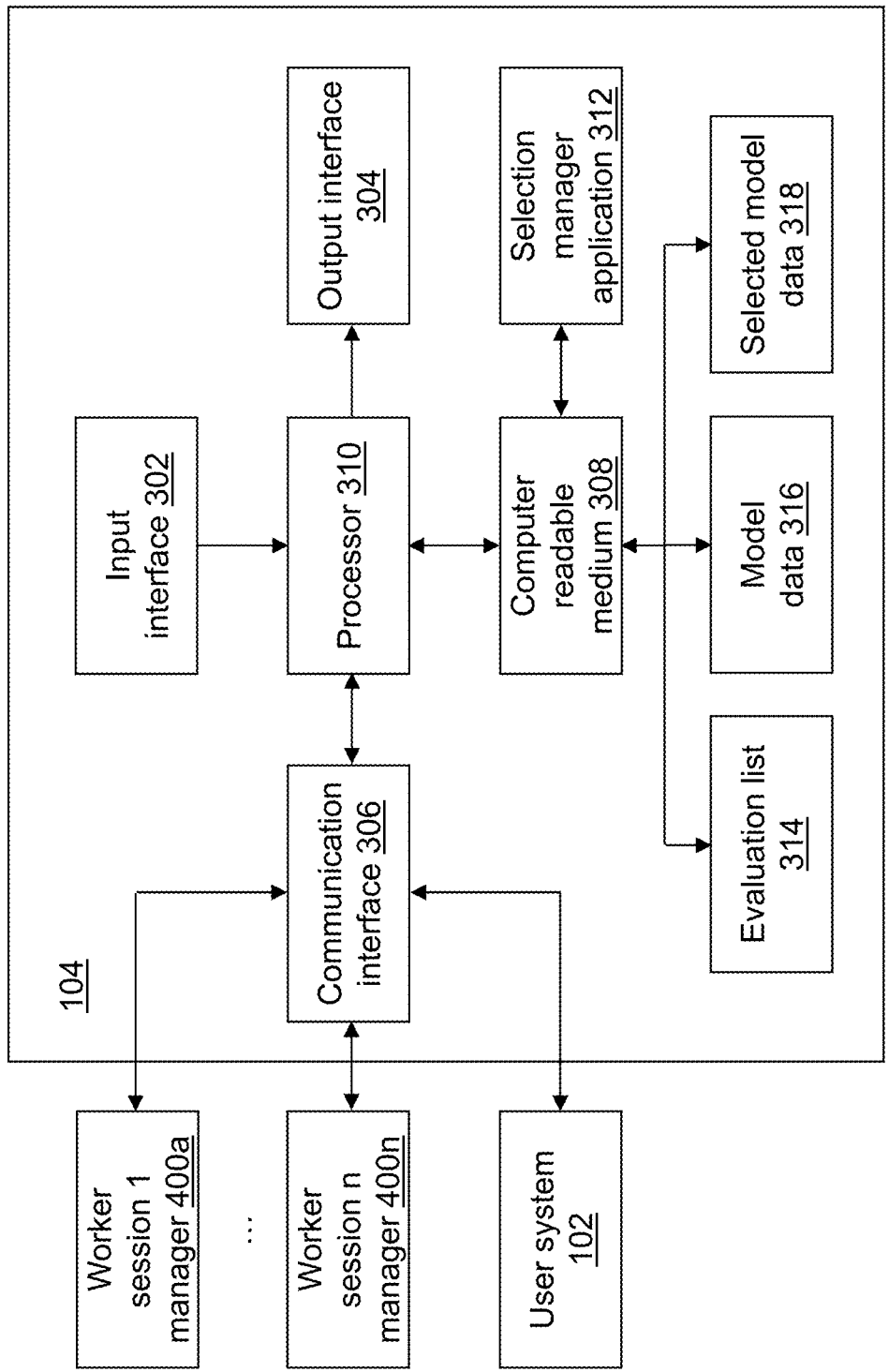
FIG. 3 depicts a block diagram of a selection manager device of the hyperparameter selection system of FIG. 1 in accordance with an illustrative embodiment.

For illustration, referring to FIG. 3, a block diagram of selection manager device 104 is shown in accordance with an illustrative embodiment. Selection manager device 104 may include a second input interface 302, a second output interface 304, a second communication interface 306, a second computer-readable medium 308, a second processor 310, a selection manager application 312, an evaluation list 314, model data 316, and selected model data 318. Evaluation list 314, model data 316, and selected model data 318 are created from results generated by worker system 106. Evaluation list 314 allows the hyperparameter tuning process to remain efficient by only evaluating "close" points once. Evaluation list 314 may be stored in memory using various data structures such as a list, an array, a tree, etc. For example, evaluation list 314 may be stored as a splay tree so that the points that are most recently added are near the root of the tree for faster searching.

Referring again to FIG. 1, the one or more computing devices of worker system 106 may include computers of any form factor that may be organized into one or more sessions, where a number of the one or more sessions is indicated by n. Worker system 106 may include a number of computing devices indicated by W. Worker system 106 may include computers of other form factors such as a desktop or a laptop, etc. Worker system 106 can include any number and any combination of form factors of computing devices organized into any number of sessions. For example, in the illustrative embodiment, worker system 106 includes a first worker session 106a, . . . , and an nth worker session 106n. Each session may include one or more computing devices, where a number of session computing devices in each session is indicated by M. In the illustrative embodiment, first worker session 106a may include a first computing device 118-1-1, . . . , and a Mth computing device 118-1-M, and nth worker session 106n may include a first computing device 118-n-1, . . . , and a Mth computing device 118-n-M. The number of computing devices indicated by W may or may not also include selection manager device 104. A number of threads may be associated with each computing device of worker system 106.

The computing devices of worker system 106 may send and receive signals through network 108 to/from selection manager device 104 and/or to/from user system 102 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4A:
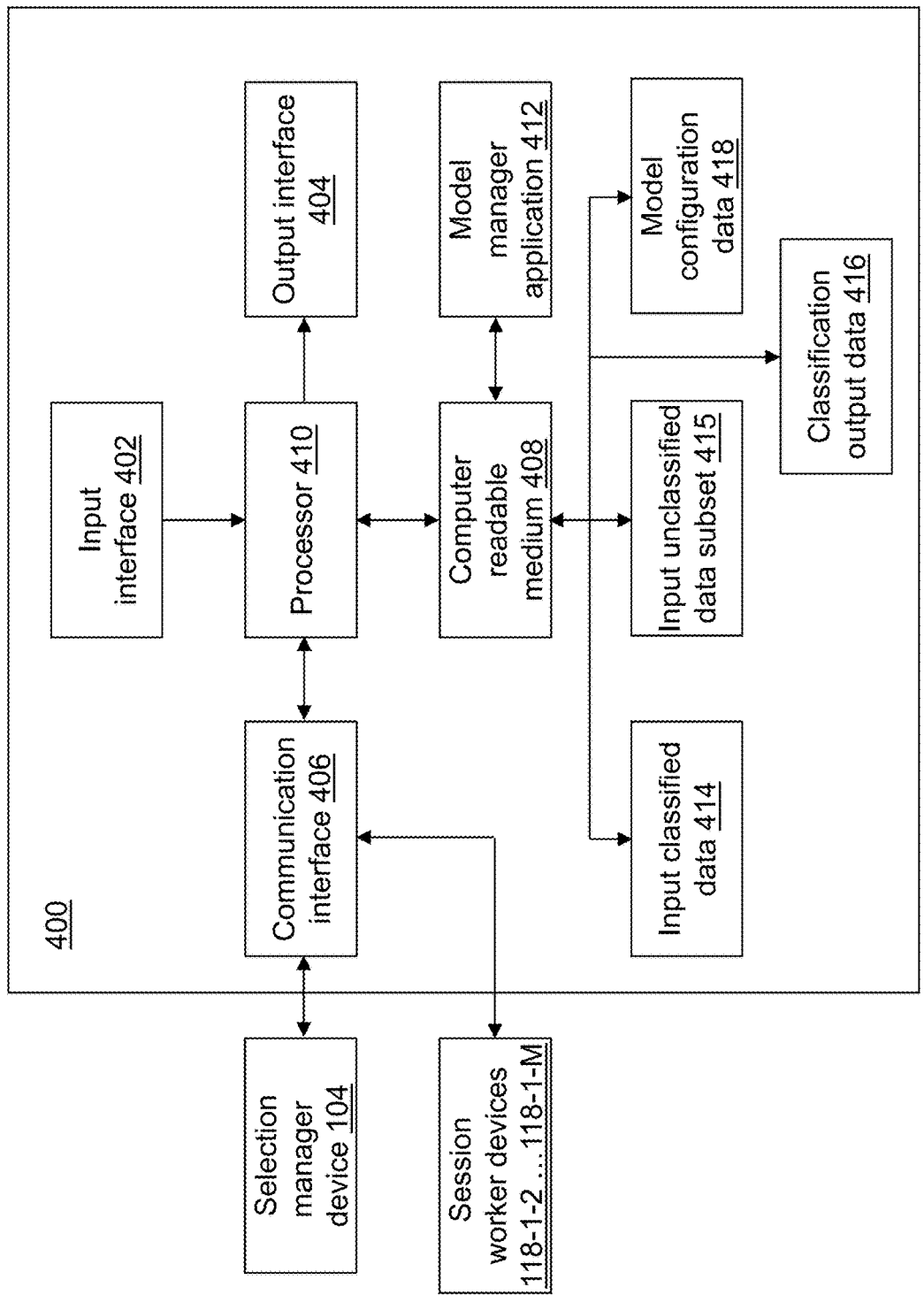
FIG. 4A depicts a block diagram of a session manager device of the hyperparameter selection system of FIG. 1 in accordance with an illustrative embodiment.

For illustration, referring to FIG. 4A, a block diagram of a session manager device 400 is shown in accordance with an example embodiment. Session manager device 400 is an example computing device selected from each session of worker system 106. For example, a first computing device of each session, such as first computing device 118-1-1 of first worker session 106a and first computing device 118-n-1 of nth worker session 106n may be an instance of session manager device 400. In the illustrative embodiment of FIG. 4A, session manager device 400 is the session manager device for first worker session 106a referred to as first computing device 118-1-1 that communicates with first computing device 118-1-1, . . . , and Mth computing device 118-1-M. Session manager device 400 may include a third input interface 402, a third output interface 404, a third communication interface 406, a third computer-readable medium 408, a third processor 410, a model manager application 412, an input classified data 414, an input unclassified data subset 415, classification output data 416, and model configuration data 418.

Figure 4B:
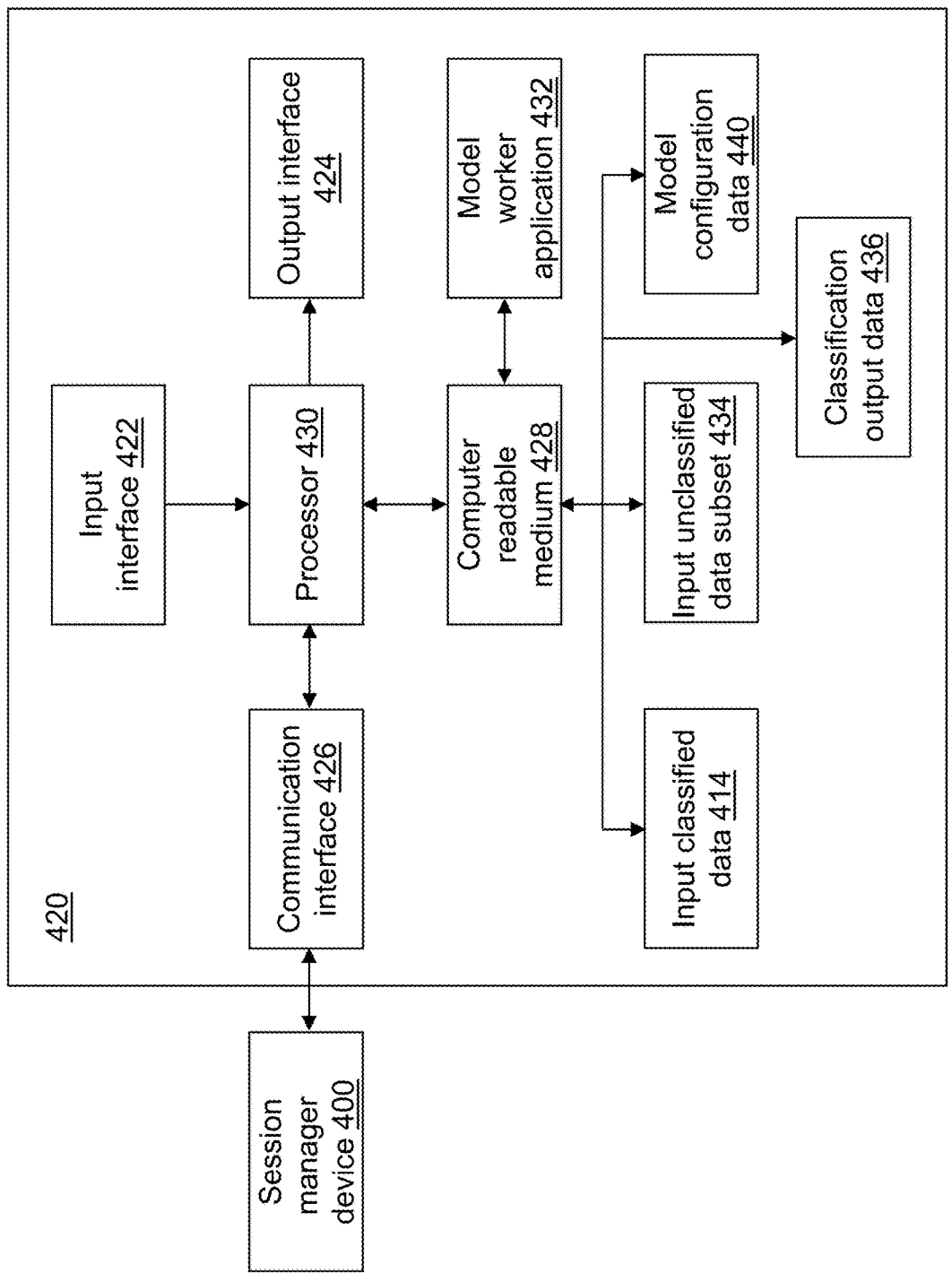
FIG. 4B depicts a block diagram of a session worker device of the hyperparameter selection system of FIG. 1 in accordance with an illustrative embodiment.

For illustration, referring to FIG. 4B, a block diagram of a session worker device 420 is shown in accordance with an example embodiment. Session worker device 420 is an example worker computing device of each session of worker system 106 excluding each session manager device 400. For example, remaining computing devices of each session, such as . . . , and Mth computing device 118-1-M of first worker session 106a and . . . , and Mth computing device 118-n-M of nth worker session 106n, may each be an instance of session worker device 420. Session worker device 420 may include a fourth input interface 422, a fourth output interface 424, a fourth communication interface 426, a fourth computer-readable medium 428, a fourth processor 430, a model worker application 432, n input classified data 414, an input unclassified data subset 434, classification output data 436, and model configuration data 440.

In some implementations, a distributed solution allows applications of big data. For example, in noise-robust semi-supervised learning, there can be a need to compute the graph Laplacian matrix, which can require a storage space of $O(n^2)$. Thus, one benefit is that scalability is provided with a distributed solution. A copy of input classified data 414 may be sent to each computing device of worker system 106. Because the input unclassified data may need to be distributed across a plurality of computing devices, each session may include a plurality of computing devices with one of the computing devices acting as the session manager and referred to as session manager device 400. The input unclassified data first may be distributed into data subsets at each computing device included in a respective session, with each session distributing the input unclassified data in a similar manner among its computing devices. For example, if first worker session 106a includes three computing devices, the input unclassified data is distributed to each computing device of first worker session 106a that may or may not include a first session manager device 400a of first worker session 106a. nth worker session 106n similarly distributes the input unclassified data among the computing devices of nth worker session 106n.

Evaluation list 314, model data 316, and selected model data 318 are created from results generated by worker system 106 executing model manager application 412 with input classified data 414 and the input unclassified data subset 434. Model manager application 412 may coordinate generation of the classification model using model worker application 432 executing at the one or more session worker devices 420 assigned to the session with input classified data 414 and their allocated subset of input unclassified data designated as input unclassified data subset 434. Session manager device 400 may or may not include input classified data 414 and a portion of the input unclassified data divided into input unclassified data subset 415. For example, session manager device 400 may coordinate the distribution of the unclassified data with or without storing a portion of the input unclassified data on third computer-readable medium 408.

Referring again to FIG. 2, each user device 200 of user system 102 may include the same or different components and combination of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into user device 200 or to make selections presented in a user interface displayed on display 216. The same interface may support both input interface 202 and output interface 204. For example, display 216 that includes a touch screen both allows user input and presents output to the user. User device 200 may have one or more input interfaces that use the same or a different input interface technology. The input interface technology further may be accessible by user device 200 through communication interface 206.

Output interface 204 provides an interface for outputting information from user device 200, for example, to a user of user device 200 or to another device. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and selection manager device 104 using communication interface 206.

Computer-readable medium 208 is a non-transitory electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Model tuning application 222 performs operations associated with selecting a hyperparameter configuration where the hyperparameter configuration defines a value for each hyperparameter used to train the classification model. The operations may be implemented using hardware, firmware, software, or any combination of these methods. Referring to the example embodiment of FIG. 2, model tuning application 222 is implemented in software (comprised of computer-readable and/or computer-executable instructions) stored in computer-readable medium 208 and accessible by processor 210 for execution of the instructions that embody the operations of model tuning application 222. Model tuning application 222 may be written using one or more programming languages, assembly languages, scripting languages, etc.

Model tuning application 222 may be implemented as a Web application. For example, model tuning application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Referring again to FIG. 3, fewer, different, or additional components may be incorporated into selection manager device 104. Second input interface 302 provides the same or similar functionality as that described with reference to input interface 202 of user device 200 though referring to selection manager device 104. Second output interface 304 provides the same or similar functionality as that described with reference to output interface 204 of user device 200 though referring to selection manager device 104. Second communication interface 306 provides the same or similar functionality as that described with reference to communication interface 206 of user device 200 though referring to selection manager device 104. Data and messages may be transferred between selection manager device 104 and/or user device 200 and session manager device 400 using second communication interface 306. Second computer-readable medium 308 provides the same or similar functionality as that described with reference to computer-readable medium 208 of user device 200 though referring to selection manager device 104. Second processor 310 provides the same or similar functionality as that described with reference to processor 210 of user device 200 though referring to selection manager device 104.

Selection manager application 312 performs operations associated with selecting sets of hyperparameter configurations to evaluate based on inputs provided by user device 200. Selection manager application 312 requests that the computing devices of worker system 106 generate a trained classification model for each hyperparameter configuration in the selected sets of hyperparameter configurations. The operations may be implemented using hardware, firmware, software, or any combination of these methods. Referring to the example embodiment of FIG. 3, selection manager application 312 is implemented in software (comprised of computer-readable and/or computer-executable instructions) stored in second computer-readable medium 308 and accessible by second processor 310 for execution of the instructions that embody the operations of selection manager application 312. Selection manager application 312 may be written using one or more programming languages, assembly languages, scripting languages, etc. Selection manager application 312 may be implemented as a Web application.

Referring again to FIG. 4A, fewer, different, and additional components may be incorporated into session manager device 400. Each session manager device 400 of each session of worker system 106 may include the same or different components or combination of components.

Third input interface 402 provides the same or similar functionality as that described with reference to input interface 202 of user device 200 though referring to session manager device 400. Third output interface 404 provides the same or similar functionality as that described with reference to output interface 204 of user device 200 though referring to session manager device 400. Third communication interface 406 provides the same or similar functionality as that described with reference to communication interface 206 of user device 200 though referring to session manager device 400. Data and messages may be transferred between session manager device 400 and another computing device of worker system 106 and/or selection manager device 104 using third communication interface 406. Third computer-readable medium 408 provides the same or similar functionality as that described with reference to computer-readable medium 208 of user device 200 though referring to session manager device 400. Third processor 410 provides the same or similar functionality as that described with reference to processor 210 of user device 200 though referring to session manager device 400.

Referring again to FIG. 4B, fewer, different, and additional components may be incorporated into session worker device 420. Each session worker device 420 of each session of worker system 106 may include the same or different components or combination of components.

Fourth input interface 422 provides the same or similar functionality as that described with reference to input interface 202 of user device 200 though referring to session worker device 420. Fourth output interface 424 provides the same or similar functionality as that described with reference to output interface 204 of user device 200 though referring to session worker device 420. Fourth communication interface 426 provides the same or similar functionality as that described with reference to communication interface 206 of user device 200 though referring to session worker device 420. Data and messages may be transferred between session worker device 420 and another computing device of the associated session of worker system 106 and/or session manager device 400 using fourth communication interface 426. Fourth computer-readable medium 428 provides the same or similar functionality as that described with reference to computer-readable medium 208 of user device 200 though referring to session worker device 420. Fourth processor 430 provides the same or similar functionality as that described with reference to processor 210 of user device 200 though referring to session worker device 420.

Model worker application 432 may be integrated with other analytic tools and may be integrated with model manager application 412 to generate a classification model using input classified data 414 and the input unclassified data distributed across the worker computing devices of each session. Model tuning application 222, selection manager application 312, model manager application 412, and/or model worker application 432 may be the same or different applications that are integrated in various manners to select a hyperparameter configuration for a classification model using input classified data 414 and the input unclassified data in a single computing device or a plurality of distributed computing devices. As an example, model tuning application 222, selection manager application 312, model manager application 412, and/or model worker application 432 may be part of an integrated data analytics software application and/or software architecture such as that offered by SAS Institute Inc. of Cary, N.C., USA. For example, Model tuning application 222, selection manager application 312, model manager application 412, and/or model worker application 432 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, model tuning application 222, selection manager application 312, model manager application 412, and/or model worker application 432 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, all of which are developed and provided by SAS Institute Inc. of Cary, N.C., USA. Data mining is applicable in a wide variety of industries.

Model tuning application 222, selection manager application 312, model manager application 412, and/or model worker application 432 may be used in a variety of industries. For example, a classification model trained using model tuning application 222, selection manager application 312, model manager application 412, and/or model worker application 432 may be used to recognize text, recognize text meaning, recognize a voice, recognize speech, recognize characteristics of images such as medical images, equipment diagnostic images, terrain images, etc., recognize types of web pages, predict whether or not an event has occurred, such as an equipment failure, etc. Model tuning application 222, selection manager application 312, model manager application 412, and/or model worker application 432 may automatically process data generated as part of operation of an enterprise, facility, system, device, etc., to classify the data and possibly provide a warning or alert associated with the classification using, for example, input interface 202, output interface 204, and/or communication interface 206 so that appropriate action can be initiated in response to the labeling. For example, medical images that include a tumor may be recognized in the input unclassified data that triggers the sending of a notification message to a clinician that a tumor has been identified based on a "tumor" label determined for the image data.

Input classified data 414 and the input unclassified data may include, for example, a plurality of rows and a plurality of columns. The plurality of rows may be referred to as observation vectors or records (observations), and the columns may be referred to as variables. Input classified data 414 and the input unclassified data may be transposed. The plurality of variables may define multiple dimensions for each observation vector. An observation vector $x_i$ may include a value for each of the plurality of variables associated with the observation i.

Each variable of the plurality of variables may describe a characteristic of a physical object. For example, if input classified data 414 and the input unclassified data includes data related to operation of a vehicle, the variables may include an oil pressure, a speed, a gear indicator, a gas tank level, a tire pressure for each tire, an engine temperature, a radiator level, etc. Input classified data 414 and the input unclassified data may include data captured as a function of time for one or more physical objects. As another example, input classified data 414 and the input unclassified data may include data related to images, where each row includes the pixels that define a single image. The images may be of any item for which image recognition or classification may be performed including, but not limited to, faces, objects, alphanumeric letters, terrain, plants, animals, etc.

Input classified data 414 includes human labeled (supervised) data that includes a $y_i$-variable (target) value that indicates a truth value related to the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc. A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system.

For example, the sensor may be medical imaging equipment (i.e., computed tomography image, magnetic resonance image, x-ray image, ultrasound image, etc.), and input classified data 414 may include image data captured by the sensor of a body part of a living thing where the image has been classified in some manner, for example, by a domain expert. For example, the image data may indicate existence of a medical condition or non-existence of the medical condition. Input classified data 414 and the unclassified data may include a reference to image data that may be stored, for example, in an image file. The existence/non-existence label may be associated with each image file in input classified data 414, but not in the unclassified data that has not been classified.

The data stored in input classified data 414 and the input unclassified data may be generated by and/or captured from a variety of sources including one or more sensors of the same or different type, one or more computing devices, etc. The data stored in input classified data 414 and the input unclassified data may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Input classified data 414 and the input unclassified data may be stored on computer-readable medium 208, on second computer-readable medium 308, on third computer-readable medium 408, and/or on fourth computer-readable medium 428, and/or on one or more computer-readable media accessible by model manager application 412 using third communication interface 406 and/or third input interface 402 or accessible by model worker application 432 using fourth communication interface 426 and/or fourth input interface 422. Data stored in input classified data 414 and the input unclassified data may be sensor measurements or signal values captured by a sensor such as a camera, may be generated or captured in response to occurrence of an event or a transaction, generated by a device such as in response to an interaction by a user with the device, etc. The data stored in input classified data 414 and the input unclassified data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input classified data 414 and the input unclassified data may be captured at different time points periodically, intermittently, when an event occurs, etc. One or more columns of input classified data 414 and the input unclassified data may include a time and/or date value.

Input classified data 414 and the input unclassified data may include data captured under normal operating conditions of the physical object. Input classified data 414 and the input unclassified data may include data captured at a high data rate such as 200 or more observations per second for one or more physical objects. For example, data stored in input classified data 414 and the input unclassified data may be generated as part of the Internet of Things (IoT), where things (e.g., machines, devices, phones, sensors) can be connected to networks and the data from these things collected and processed within the things and/or external to the things before being stored in input classified data 414 and the input unclassified data. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input classified data 414 and the input unclassified data.

Input classified data 414 and the input unclassified data may be stored using various structures as known to those skilled in the art including one or more files of a file system, a relational database, one or more tables of a system of tables, a structured query language database, etc. Each session manager device 400 may coordinate access to input classified data 414 and the input unclassified data that is distributed across the session worker devices of the associated session that may include zero or more session worker devices. For example, input classified data 414 and the input unclassified data may be stored in a cube distributed across the computing devices of each session that is a grid of computers as understood by a person of skill in the art. As another example, input classified data 414 and the input unclassified data may be stored across the computing devices of each session that form a multi-node Hadoop® cluster. For instance, Apache™ Hadoop® is an open-source software framework for distributed computing supported by the Apache Software Foundation. As another example, input classified data 414 and the input unclassified data may be stored across the computing devices of each session that form a cloud of computers and may be accessed using cloud computing technologies, as understood by a person of skill in the art. The SAS® LASR™ Analytic Server may be used as an analytic platform to enable multiple users to concurrently access data stored in input classified data 414 and the input unclassified data. The SAS® Viya™ open, cloud-ready, in-memory architecture also may be used as an analytic platform to enable multiple users to concurrently access data stored in input classified data 414 and the input unclassified data. SAS Cloud Analytic Services (CAS) may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
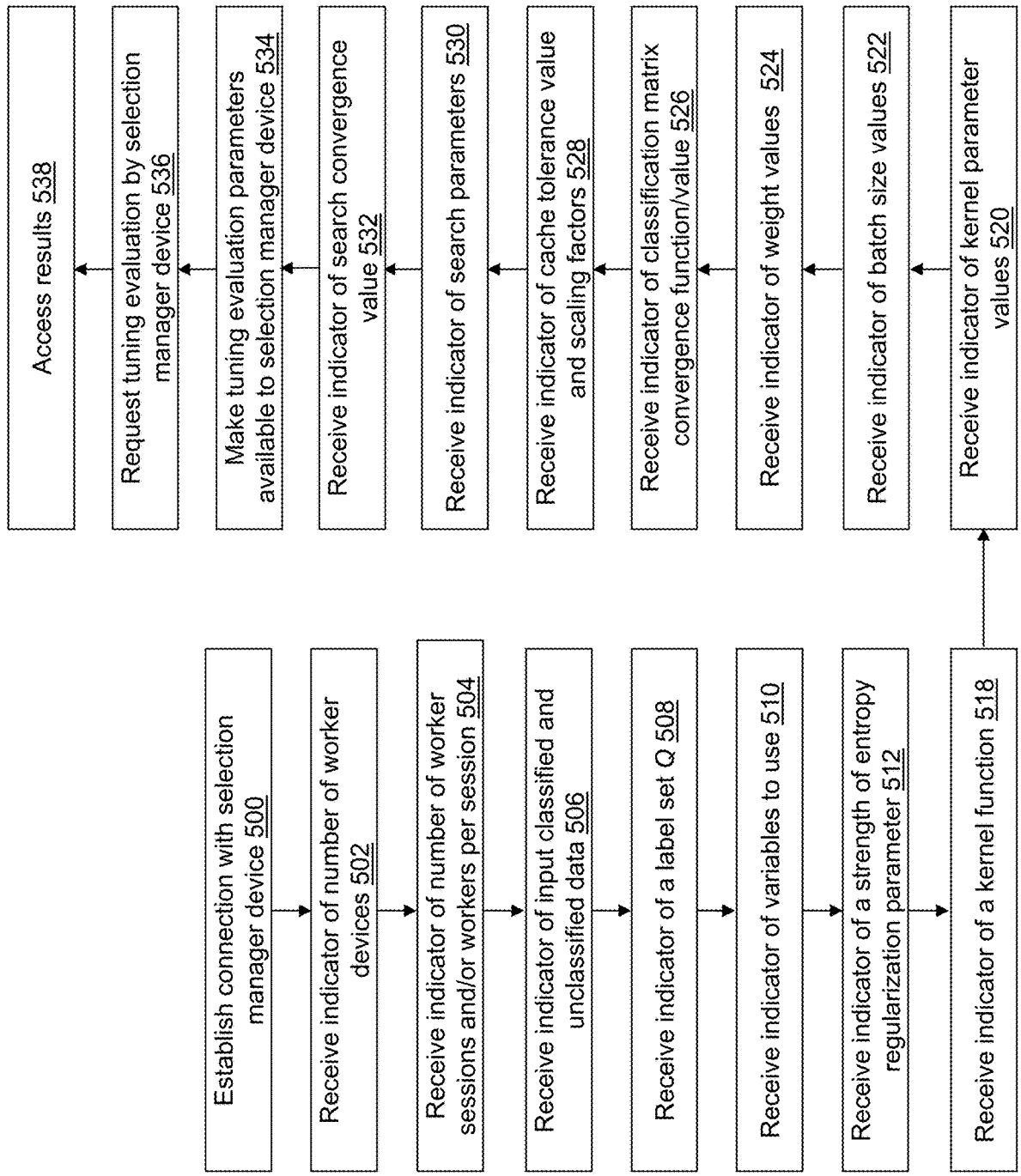
FIG. 5 depicts a flow diagram illustrating examples of operations performed by the user device of FIG. 2 in accordance with an illustrative embodiment.

Referring to FIG. 5, example operations associated with model tuning application 222 are described. Additional, fewer, or different operations may be performed depending on the embodiment. The order of presentation of the operations of FIG. 5 is not intended to be limiting. A user can interact with one or more user interface windows presented to the user in display 216 under control of model tuning application 222 independently or through a browser application in an order selectable by the user. Although some of the operational flows are presented in sequence, the various operations may be performed in various repetitions, concurrently, and/or in other orders than those that are illustrated. For example, a user may execute model tuning application 222, which causes presentation of a first user interface window, which may include a plurality of menus and selectors such as drop-down menus, buttons, text boxes, hyperlinks, etc. associated with model tuning application 222 as understood by a person of skill in the art.

In an operation 500, a connection is established with selection manager device 104. User device 200 accepts commands from a user and relays necessary instructions to selection manager device 104.

In an operation 502, a first indicator may be received that indicates a value of W the number of computing devices or nodes of worker system 106 that may include selection manager device 104 (for example, the same or another indicator may indicate whether or not to include selection manager device 104 or it may or may not be included by default). The first indicator may further indicate whether selection manager device 104 is configured in a single-machine mode or a distributed mode. In an alternative embodiment, the first indicator may not be received. For example, a default value may be stored, for example, in computer-readable medium 208 and used automatically. In another alternative embodiment, W may not be selectable. Instead, a fixed, predefined value may be used. The value further may be automatically determined based on a number of computing devices connected to selection manager device 104.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on selection manager device 104. More simply, single-machine mode means multithreading on selection manager device 104. Single-machine mode uses the number of CPUs (cores) on selection manager device 104 to determine the number of concurrent threads. For example, one thread per core may be used though a number of threads on any computing device may be changed under control of the user. A grid host may be specified for a distributed mode and identify a domain name system (DNS) or IP address of selection manager device 104, when selection manager device 104 is a separate device from user device 200.

In an operation 504, a second indicator may be received that indicates the value of n the number of the one or more sessions and/or the value of M the number of computing devices included in each session. Within each session, each computing device of that session may also use multiple threads. In an alternative embodiment, the second indicator may not be received. For example, default values may be stored, for example, in computer-readable medium 208 and used automatically. In another alternative embodiment, M or n may not be selectable. Instead, a fixed, predefined value may be used. The value(s) further may be automatically determined based on W and other criteria as described further below such that the user does not specify either or only one of n the number of the one or more sessions and M the number of computing devices included in each session.

In an operation 506, a third indicator may be received that indicates input classified data 414 and the input unclassified data. For example, the first indicator indicates a location and a name of input classified data 414 and the input unclassified data. As an example, the first indicator may be received by model tuning application 222 after selection from a user interface window or after entry by a user into a user interface window.

In an operation 508, a fourth indicator may be received that indicates a label set Q associated with input classified data 414. For example, the label set Q includes a list of permissible values that the $y_i$-variable (target) value of each observation vector $x_i$ may have. For illustration, if input classified data 414 includes text images of numeric digits, the label set Q includes c=10 permissible values that may be indicated as Q={1, . . . , c}, where Q=1 may be associated with the digit "0", Q=2 may be associated with the digit "1", Q=3 may be associated with the digit "2", . . . , Q=10 may be associated with the digit "9". c is a number of classes in label set Q. No $y_i$-variable (target) value or a variable value of zero may indicate that the associated observation vector $x_i$ is not classified when input classified data 414 and the input unclassified data are stored together in memory or in a single dataset.

When input classified data 414 and the input unclassified data are stored together in memory or in a single dataset, input classified data 414 may be extracted. Input classified data 414 and the input unclassified data together define a point set x={$x_1$, . . . , $x_l$, $x_{l+1}$, . . . , $x_n$}, where n indicates a total number of data points or observation vectors $x_i$, where the observation vectors $x_i$ (i≤l) are labeled such that $y_i \in Q$, and the remaining observation vectors $x_i$ (l<i≤n) are unlabeled such that $y_i \notin Q$. Thus, l indicates a number of classified data points or observation vectors $x_i$ included in input classified data 414. For illustration, l may be a small percentage, such as less than 1% of the total number of observation vectors $x_i$.

In an operation 510, a fifth indicator may be received that indicates a plurality of variables of input classified data 414 and the input unclassified data to define $x_i$. The fifth indicator may indicate that all or only a subset of the variables stored in input classified data 414 and the input unclassified data be used to define model data 316. For example, the fifth indicator indicates a list of variables to use by name, column number, etc. In an alternative embodiment, the fifth indicator may not be received. For example, all of the variables may be used automatically.

In an operation 512, a sixth indicator may be received that indicates a strength of entropy regularization parameter value λ, where λ is selected between zero and one, non-inclusive. In an alternative embodiment, the sixth indicator may not be received. For example, a default value may be stored, for example, in computer-readable medium 208 and used automatically when the sixth indicator is not received. In an alternative embodiment, the strength of entropy regularization parameter value may not be selectable. Instead, a fixed, predefined value may be used. Merely for illustration, the strength of entropy regularization parameter value λ=0.5 may be used as a default value.

In an operation 518, a seventh indicator of a kernel function to apply may be received. For example, the seventh indicator indicates a name of a kernel function. The seventh indicator may be received by model tuning application 222 after selection from a user interface window or after entry by a user into a user interface window. A default value for the kernel function may further be stored, for example, in computer-readable medium 208. As an example, a kernel function may be selected from "Gaussian", "Exponential", "Linear", "Polynomial", "Sigmoid", "Radial Basis", "K Nearest Neighbors", etc. For example, a default kernel function may be the Gaussian kernel function though any positive definite kernel function could be used. Of course, the kernel function may be labeled or selected in a variety of different manners by the user as understood by a person of skill in the art. In an alternative embodiment, the kernel function may not be selectable, and a single kernel function is implemented in model tuning application 222. As another example, the Gaussian kernel function may be used by default or without allowing a selection.

In an operation 520, an eighth indicator of one or more values for each hyperparameter associated with the kernel function selected in operation 518 may be received. For example, the Gaussian kernel function may be defined as:

$$\exp\frac{-\|x_i - x_j\|^2}{2s^2}$$

where s is a kernel parameter that is termed a Gaussian bandwidth parameter and is a hyperparameter for the Gaussian kernel function. For example, one or more values for s, the Gaussian bandwidth parameter, may be received. Alternatively, one or more default values for the kernel parameter may be stored, for example, in computer-readable medium 208 and used automatically. In another alternative embodiment, the one or more values of the kernel parameter may not be selectable. Instead, one or more fixed, predefined values may be used. The one or more values of the kernel parameter may be defined in various manners such as using a list of possible values or using a minimum kernel parameter value, a maximum kernel parameter value, and a kernel parameter step value. For example, a list of kernel parameter values may be defined that includes the minimum kernel parameter value and each subsequent value adding the kernel parameter step value up to and including the maximum kernel parameter value.

For illustration, the K Nearest Neighbors (KNN) kernel function may also be defined as:

$$\exp\frac{-\|x_i - x_j\|^2}{2s^2}$$

where s is one kernel parameter. The KNN kernel function may also include k that is a number of nearest neighbors and is another hyperparameter for the KNN kernel function. For example, one or more default values for the number of nearest neighbors may be stored, for example, in computer-readable medium 208 and used automatically. In another alternative embodiment, the one or more values of the number of nearest neighbors may not be selectable. Instead, one or more fixed, predefined values may be used. The one or more values of the number of nearest neighbors may be defined in various manners such as using a list of possible values or using a minimum number of nearest neighbors value, a maximum number of nearest neighbors value, and a number of nearest neighbors step value. For example, a list of a number of nearest neighbors values may be defined that includes the minimum number of nearest neighbors value and each subsequent value adding the number of nearest neighbors step value up to and including the maximum number of nearest neighbors value.

In an operation 522, a ninth indicator may be received that indicates one or more batch size values h. As described further below, each iteration, a batch size number of observation vectors that have been classified are added to input classified data 414 and removed from the input unclassified data. In an alternative embodiment, the ninth indicator may not be received. For example, one or more default values for the batch size may be stored, for example, in computer-readable medium 208 and used automatically. In another alternative embodiment, the one or more values of the batch size may not be selectable. Instead, one or more fixed, predefined values may be used. The one or more values of the batch size may be defined in various manners such as using a list of possible values or using a minimum batch size value, a maximum batch size value, and a batch size step value. For example, a list of batch size values may be defined that includes the minimum batch size value and each subsequent value adding the batch size step value up to and including the maximum batch size value.

In an operation 524, a tenth indicator may be received that indicates one or more weight values a. In an alternative embodiment, the tenth indicator may not be received. For example, one or more default values for the weight values may be stored, for example, in computer-readable medium 208 and used automatically. In another alternative embodiment, the one or more values of the weight may not be selectable. Instead, one or more fixed, predefined values may be used. The one or more values of the weight may be defined in various manners such as using a list of possible values or using a minimum weight value, a maximum weight value, and a weight step value. For example, a list of weight values may be defined that includes the minimum weight value and each subsequent value adding the weight step value up to and including the maximum weight value.

In an operation 526, an eleventh indicator of a classification matrix convergence function and/or a classification convergence value may be received. For example, the eleventh indicator indicates a name of a classification matrix convergence function. The eleventh indicator may be received by model tuning application 222 after selection from a user interface window or after entry by a user into a user interface window. A default value for the classification matrix convergence function may further be stored, for example, in computer-readable medium 208. As an example, a classification matrix convergence function may be selected from "Num Iterations", "Within Tolerance", etc. For example, a default convergence test may be "Num Iterations". Of course, the classification matrix convergence function may be labeled or selected in a variety of different manners by the user as understood by a person of skill in the art. In an alternative embodiment, the classification matrix convergence function may not be selectable, and a single classification matrix convergence function is implemented by model tuning application 222. For example, the classification matrix convergence function "Num Iterations" may be used by default or without allowing a selection.

As an example, when the classification matrix convergence function "Num Iterations" is indicated, the classification convergence value is a number of iterations $M_L$. Merely for illustration, the number of iterations $M_L$ may be defined between 10 and 1000 though the user may determine that other values are more suitable for their application as understood by a person of skill in the art, for example, based on the classification accuracy desired, computing resources available, size of the input unclassified data, etc. As another example, when the classification matrix convergence function "Within Tolerance" is indicated, the classification convergence value may be a tolerance value $\tau$. A default value for the classification convergence function may be stored, for example, in computer-readable medium 208 and used automatically when the thirteenth indicator is not received. In an alternative embodiment, the classification convergence value may not be selectable. Instead, a fixed, predefined value may be used.

In an operation 528, a twelfth indicator may be received that defines a cache tolerance value and a scaling factor value for each hyperparameter. The cache tolerance value is used to determine when a subsequent hyperparameter configuration is "close enough" to a previously executed configuration to not repeat execution with the subsequent hyperparameter configuration. The scaling factor value for each hyperparameter is used to scale the hyperparameters relative to each other. In an alternative embodiment, the twelfth indicator may not be received. For example, default value may be stored, for example, in computer-readable medium 208 and used automatically. An illustrative default value for the cache tolerance value is 1.0e-9. An illustrative default value for the scaling factor value for each hyperparameter is one. In another alternative embodiment, the cache tolerance value and the scaling factor value for each hyperparameter may not be selectable. Instead, fixed, predefined values may be used.

In an operation 530, a thirteenth indicator may be received that defines values for one or more search parameters associated with a tuning search method. For example, a maximum number of configuration evaluations $n_b$, a population size $n_p$, a number of centers $n_c < n_p$, an initial step size value $\Delta$, and/or a decrease criterion value $\beta \in (0,1)$, etc. may be defined by the thirteenth indicator. The tuning search method may be "LHS+GA/GSS" in which a Latin hypercube sampling (LHS) search method is used to generate a first set of hyperparameter configurations that are each executed to generate a cost function value. The cost function values and the hyperparameter configuration associated with each are used to initialize a genetic search method (GA). Each population of the GA search method may be enhanced with a "growth step" in which a genetic set search (GSS) search method is used to locally improve some of the more promising members of the GA population.

For illustration, the LHS search method generates uniform hyperparameter values across the range of each hyperparameter and randomly combines them across hyperparameters. If the hyperparameter is continuous or discrete with more levels than a requested sample size, a uniform set of samples is taken across the hyperparameter range including a lower and an upper bound. If the hyperparameter is discrete with fewer levels than the requested sample size, each level is repeated an equal number of times across the set of hyperparameter configurations determined by the LHS search method. If a last set of hyperparameter configurations is less than the number of levels, the last set of values for the hyperparameter is uniformly sampled across the set of levels given the remaining set size. The samples for each hyperparameter are randomly shuffled so that the combination of hyperparameters is random—the first values for each hyperparameter are combined, followed by all the second values, etc. This LHS search method ensures that the lower and upper bounds of the hyperparameter tuning range are included, and for discrete hyperparameters with a number of levels less than the requested sample size, the levels are sampled evenly with the possible exception of the last set of values when the number of samples is not evenly divisible by the number of levels. Otherwise, with random selection from n bins, when the number of levels is much less than the requested sample size, the level values are likely to not be sampled uniformly.

For illustration, the GA search method defines a family of local search algorithms that seek optimal solutions to problems by applying the principles of natural selection and evolution. Members of a current generation that have passed a selection process either go to a crossover operator or are passed unchanged into the next generation based on a pre-defined crossover probability. Members of the current generation that have passed the cross-over process either go to a mutation operator or are passed unchanged into the next generation based on a pre-defined mutation probability.

For illustration, the GSS search method is designed for problems that have continuous variables and have the advantage that, in practice, they often require significantly fewer evaluations to converge than does a GA search method. Furthermore, a GSS search method can provide a measure of local optimality that is very useful in performing multimodal optimization. The GSS search method may add additional "growth steps" to the GA search method whenever the hyperparameter is a continuous variable. For example, a local search selection may include a small subset of hyperparameter values selected based on their fitness score and distance to other hyperparameter values and on pre-existing locally optimal hyperparameter values. A local search optimization may be applied such that the lower and upper bounds of the hyperparameter are modified to temporarily fix integer variables to their current setting. These additional growth steps may be performed each iteration to permit selected hyperparameter configurations of the population (based on diversity and fitness) to benefit from local optimization over the continuous variables.

In an operation 532, a fourteenth indicator of a search convergence value $c_s$ may be received. For illustration, a convergence criterion may be that a total sum of a difference between the hyperparameters selected in two adjacent iterations is smaller than search convergence value $c_s$. In an alternative embodiment, the fourteenth indicator may not be received. For example, a default value may be stored, for example, in computer-readable medium 208 and used automatically when the fourteenth indicator is not received. In an alternative embodiment, the search convergence value $c_s$ may not be selectable. Instead, a fixed, predefined value may be used. Merely for illustration, the search convergence value $c_s=0.1$ may be used as a default value.

In an operation 534, the tuning evaluation parameters that may include the parameters indicated in operations 502 to 532 are made available to selection manager device 104. For example, the values of any of the parameters that are not default values may be sent to selection manager device 104.

As another option, a location of the values of any of the parameters that are not default values may be sent to selection manager device 104. As still another option, a location of the values of any of the parameters that are not default values may be provided to selection manager device 104 in a computer memory location that is known to selection manager device 104.

In an operation 536, a tuning evaluation to select hyperparameters is requested of selection manager device 104 using the tuning evaluation parameters.

In an operation 538, tuning evaluation results are accessed. For example, an indicator may be received that indicates that the tuning process is complete. For example, one or more output tables may be presented on display 216 when the tuning process is complete. As another option, display 216 may present a statement indicating that the tuning process is complete. The user can access the output tables in the specified location. For example, the user can select the hyperparameters included in a "Best Configuration" output table. As another option, the user can select a hyperparameter configuration included in s "Tuner Results" output table that is less complex, but provides a similar cost function value in comparison to the hyperparameters included in the "Best Configuration" output table.

Figure 6A:
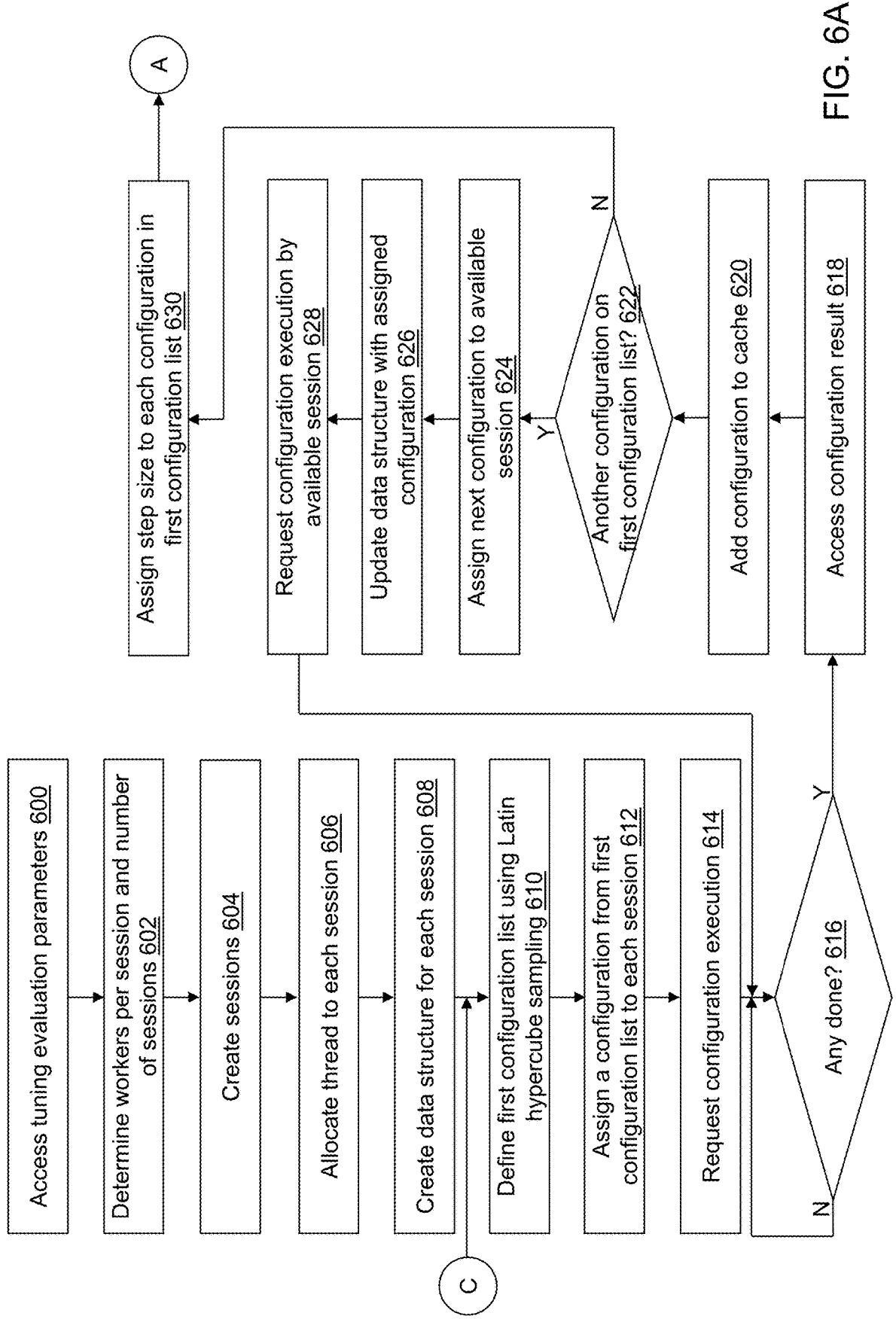
FIGS. 6A to 6C depict a flow diagram illustrating examples of operations performed by the selection manager device of FIG. 3 in accordance with an illustrative embodiment.
Figure 6B:
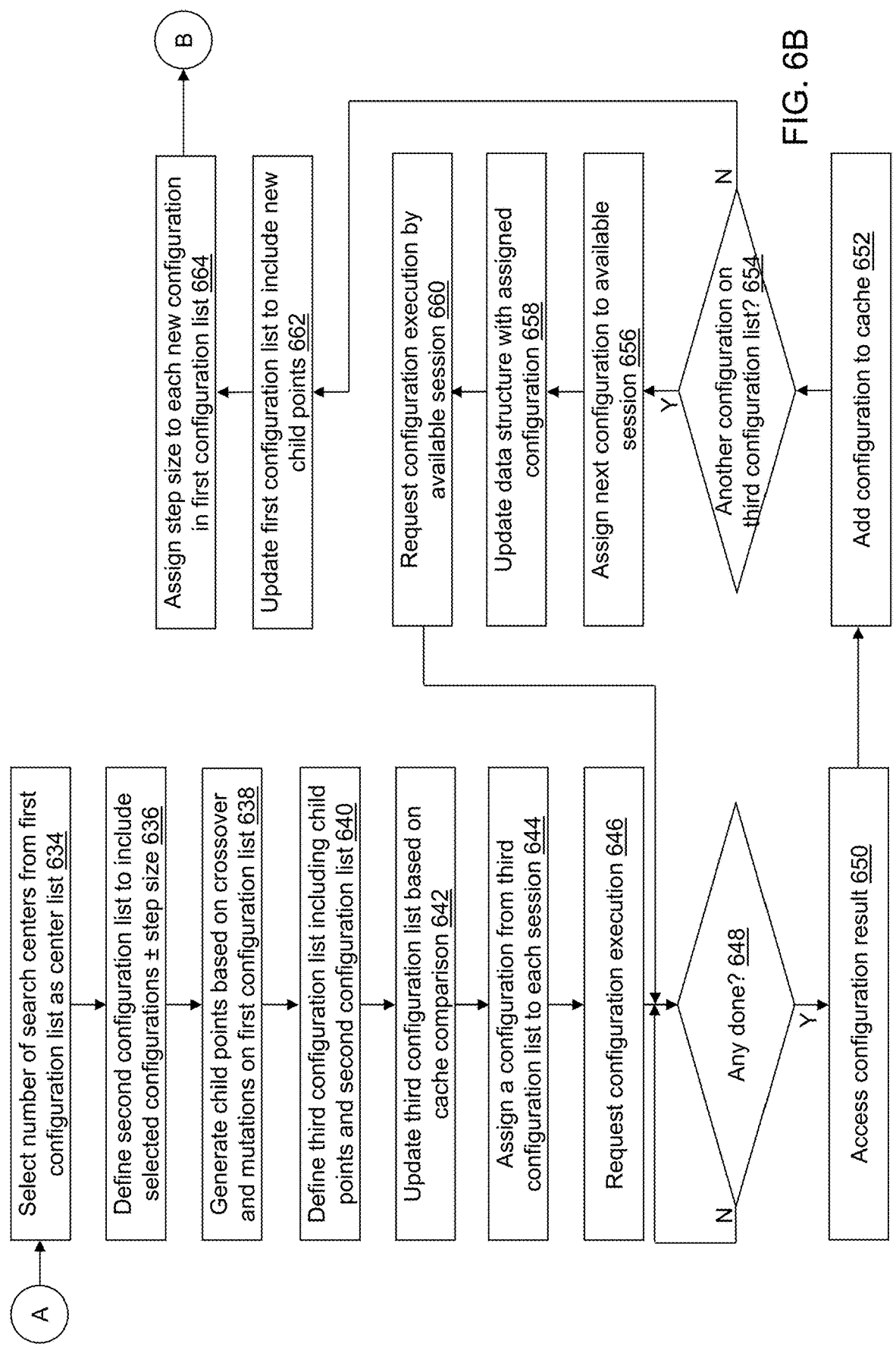
Figure 6C:
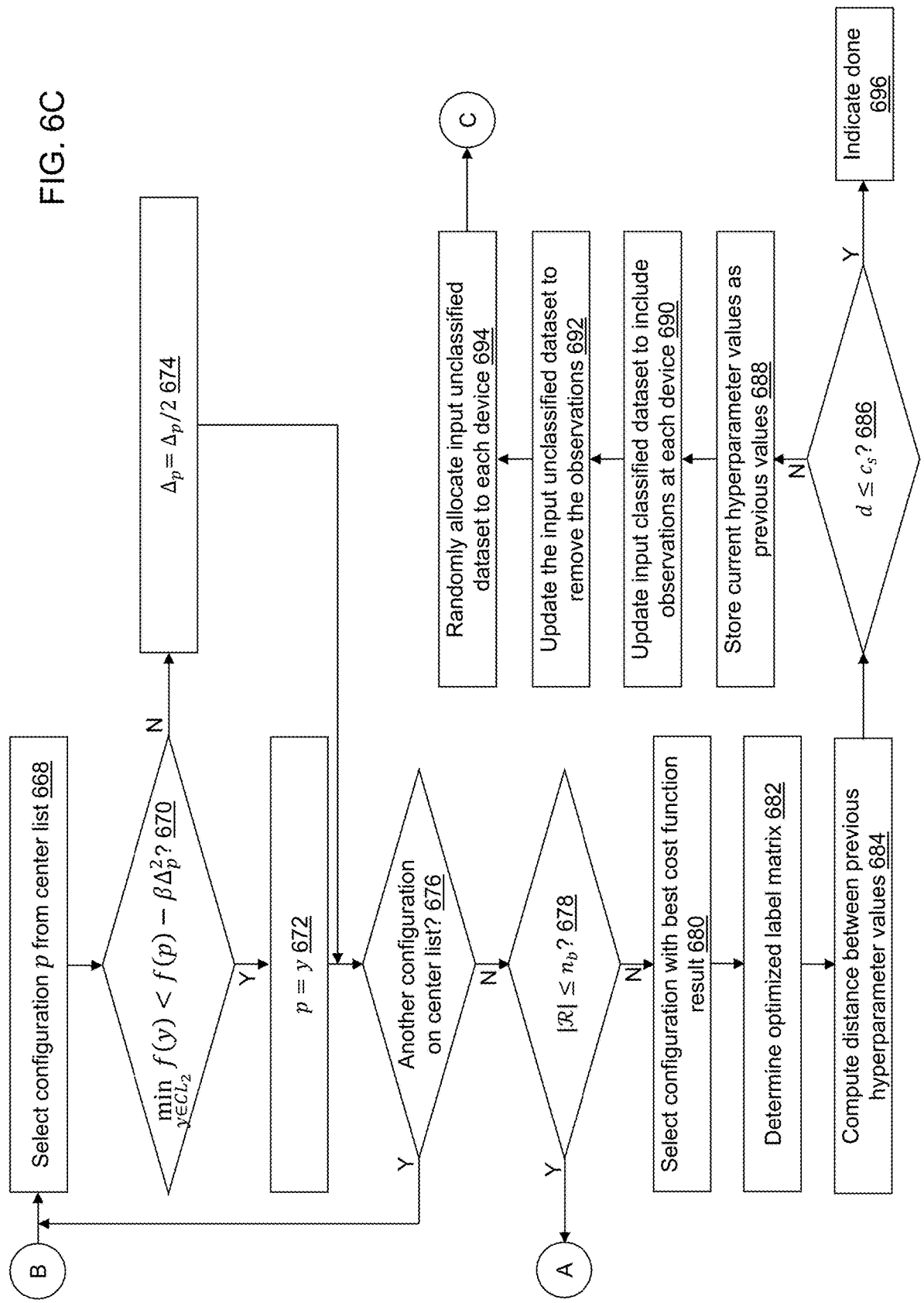

Referring to FIGS. 6A, 6B, and 6C, example operations associated with selection manager application 312 are described. Additional, fewer, or different operations may be performed depending on the embodiment. The order of presentation of the operations of FIGS. 6A, 6B, and 6C is not intended to be limiting. Selection manager device 104 establishes communication with the computing devices of worker system 106, sends instructions to each session manager device 400 associated with each session established by selection manager device 104, collects and aggregates the results of computations from each session, and communicates final results to user device 200. Selection manager device 104 may utilize itself as a worker computing device of worker system 106. The computing devices of worker system 106 receive instructions from selection manager device 104, store and process data, and send the results of computations back to selection manager device 104 under control of session manager device 400 associated with each session. The worker computing devices of each session may also communicate to each other directly to complete tasks.

In an operation 600, tuning evaluation parameters obtained by model tuning application 222 are accessed. For example, values for parameters indicated in operations 502 to 532 and made available to selection manager device 104 in operation 526 are accessed.

In an operation 602, the number of workers per session M and the number of sessions n are determined. For example, when the second indicator specifies $N_s$, that value is used for the number of sessions, or when the second indicator specifies M, that value is used for the number of workers per session. If W is equal to all of the workers that are connected to selection manager device 104 and there are at least 16 worker computing devices included in worker system 106, $N_s$ may be limited to eight so that the number of workers per session M is at least two.

Optionally, the second indicator may indicate that M is set based on a size of input classified data 414 and the input unclassified data. For example, M may be set based on a number of rows r and a number of columns c of input classified data 414 and the input unclassified data and a distribution factor d. For illustration, M=1+rcd. An illustrative value of $d=2e^{-8}$ may be used so that another session worker device 420 is added to each session for every 50 million data values. The value of d may be selected by a user of user device 200. The number of columns c further may be the number of variables to use instead of a total number of columns. The number of rows r further may be the number of rows to include in the input unclassified data.

$N_s$ may be determined as either one less than a population size specified for the GA tuning search method because one hyperparameter configuration is carried forward each iteration. The best point is carried forward so that if the next iteration does not find an improvement, the returned set of evaluations still includes the current best for consideration in generating the next iteration of hyperparameter configurations. For the GSS tuning search method, twice the number of hyperparameters is added to the value of N. For the LHS tuning search method, n is determined as one less than a sample size. $N_s$ may then be limited by a configuration of selection manager device 104. When selection manager device 104 is configured in single-machine mode and $N_s$ is greater than four and not specified by the second indicator, $N_s$ is limited to four. When selection manager device 104 is configured in single-machine mode and $N_s$ is specified by the second indicator, $N_s$ may be limited to 32 or a number of threads of selection manager device 104. When selection manager device 104 is configured in distributed mode, and $N_s$ is not specified by the second indicator, $N_s \leq W/M$ may be used. When selection manager device 104 is configured in distributed mode and n is specified by the second indicator, $N_s \leq 2 W/M$ may be applied.

For illustration, if a population size specified for a GA search method is ten, even if W=100 and M=2 based on a size of input classified data 414 and the input unclassified data, $N_s$=10 instead of $N_s$=50 because the GA population size (number of hyperparameter configurations created each iteration by the GA search method) limits the number of hyperparameter configurations created each iteration.

When $N_s$ is greater than one and M is equal to one, selection manager application 312 is executed in a model parallel mode; when M is greater than one and $N_s$ is equal to one, selection manager application 312 is executed in a data parallel mode; and when both M and $N_s$ are greater than one, selection manager application 312 is executed in a data and model parallel mode. In an automatic mode, $N_s$ may be selected to be as large as possible with M as small as possible subject to the size of input classified data 414 and the input unclassified data because model parallel is more efficient than data parallel.

In an operation 604, the number of sessions $N_s$ are created to include the number of workers per session M with session manager device 400 selected for each created session. The input unclassified data is randomly allocated to each session to define input unclassified data subset 415 and/or input unclassified data subset 434. A copy of input classified data 414 is provided to each session as well.

In an operation 606, a thread is allocated from an available thread pool to each created session. The allocated threads each manage the communications between selection manager device 104 and each session manager device 400.

In an operation 608, a data structure is created for each session through which each session is notified of input classified data 414 and the input unclassified data, of the hyperparameter values for the assigned hyperparameter configuration, etc. An illustrative data structure includes a thread identifier that links the data structure to each thread, a session handle for the thread, a parameter list, the hyperparameter values assigned to the thread, a completion indicator, etc. The session handle contains information about the session that was started in a new process to run actions.

In an operation 610, the first configuration list is defined using LHS and its associated parameters. The first configuration list includes a plurality of hyperparameter configurations where each hyperparameter configuration includes a value for each hyperparameter to evaluate [s, k, h, α], where the set of hyperparameters may include [h, α] in addition to the hyperparameters associated with the kern function selected in operation 518 such as [s] with the Gaussian kernel function selected or [s, k] with the KNN kernel function selected. A set of hyperparameter configurations includes a plurality of hyperparameter configurations selected for evaluation before a next set of hyperparameter configurations is selected for evaluation based on the tuning search method and the cost function values computed for each hyperparameter configuration.

In an operation 612, a single configuration is selected from the first configuration list and assigned to each created session by loading the values in the data structure associated with the selected session. Depending on the number of created sessions $N_s$ relative to the number of configurations included on the first configuration list, all of the configurations defined in the first configuration list may be assigned or less than all of the configurations may be assigned.

Figure 7:
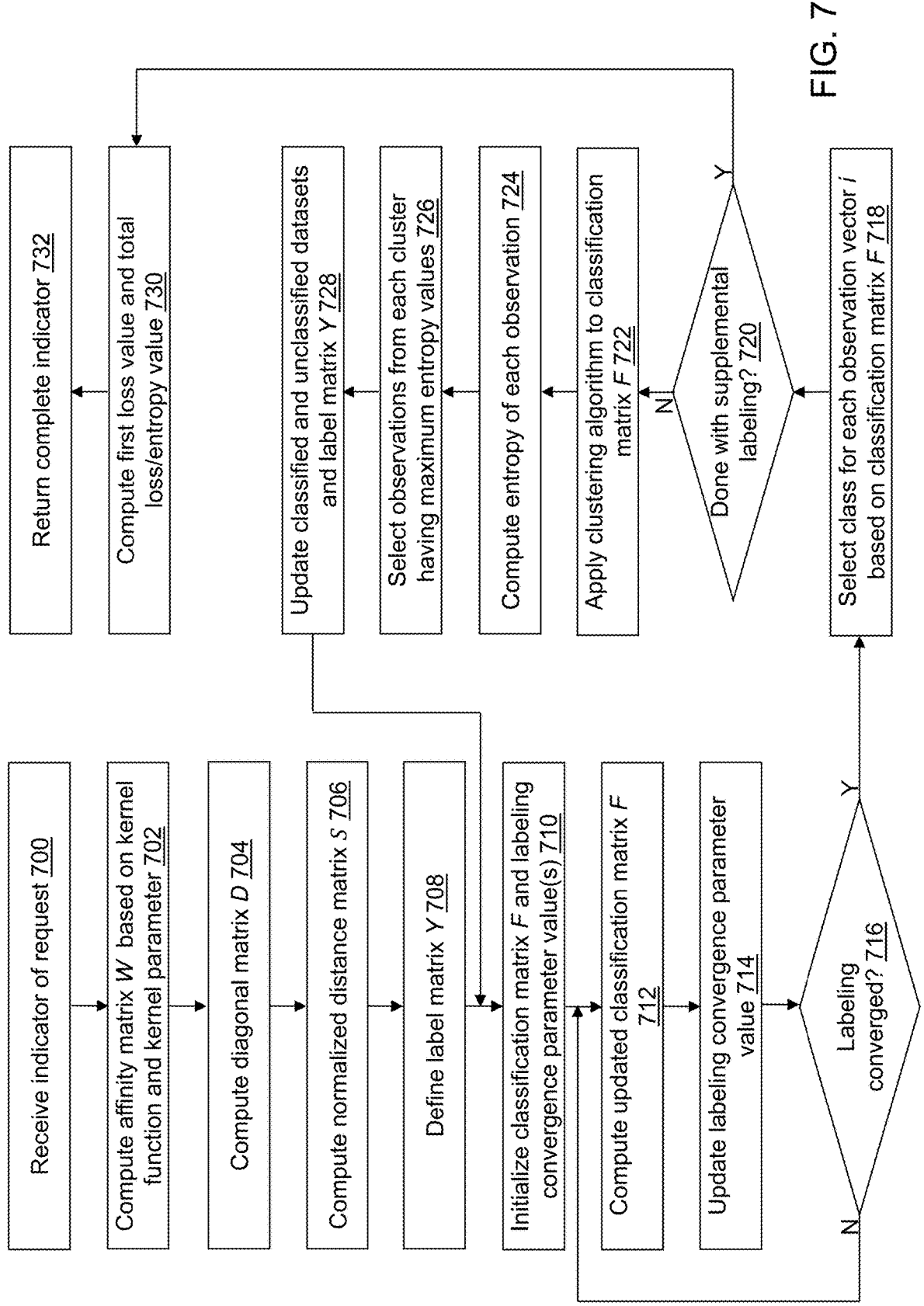
FIG. 7 depicts a flow diagram illustrating examples of operations performed by the session manager/worker device of FIGS. 4A and 4B in accordance with an illustrative embodiment.

In an operation 614, each session is requested to execute its assigned hyperparameter configuration based on the parameter values in the data structure. The handle to the session process stored in the data structure associated with the selected session may be used to make this request or call. FIG. 7 describes the operations performed by each session in response to the request.

In an operation 616, a determination is made concerning whether or not any execution is done. For example, session manager device 400 may set the completion indicator to indicate done in the data structure associated with it. If no execution is done, processing continues in operation 616 until indication that a session is done is received. If any execution is done, processing continues in an operation 618. For illustration, selection manager device 104 loops through each of its thread handles, checking to see if that particular thread is busy or free. When a session finishes evaluating its assigned hyperparameter configuration, session manager device 400 returns the computed values back to selection manager device 104 and sets its completion indicator indicating that it is free to receive a new hyperparameter configuration for evaluation.

In operation 618, results from the configuration execution are accessed in association with the set of hyperparameter values defined in the configuration assigned to the session that has completed its computations. For example, a cost function value, a classification matrix F, and a label matrix Y may be accessed using the data structure.

In an operation 620, the results including the cost function value, classification matrix F, and label matrix Y computed from execution of the set of hyperparameter values are stored in evaluation list 314 and in model data 316 in association with the set of hyperparameter values.

In an operation 622, a determination is made concerning whether or not the first configuration list includes another hyperparameter configuration to evaluate that has not been assigned to a session. If the first configuration list includes another hyperparameter configuration to evaluate, processing continues in an operation 624. If the first configuration list does not include another hyperparameter configuration to evaluate, processing continues in an operation 630.

In operation 624, a next hyperparameter configuration is selected from the first configuration list and assigned to the now free session.

In an operation 626, the data structure associated with the now free session is updated to include the next assigned hyperparameter configuration.

In an operation 628, a request is sent to session manager device 400 associated with the now free session to execute model manager application 412 with the hyperparameter configuration included in the data structure, and processing continues in operation 616 to continue to monitor for sessions that have completed their assigned hyperparameter configuration evaluation.

In operation 630, a step size is assigned to each configuration included in the first configuration list using the initial step size value A, and processing continues in an operation 634 shown referring to FIG. 6B.

In operation 634, a number of search centers $n_c$ is selected from the first configuration list to define a center list. Similar to the first configuration list, the center list includes a plurality of hyperparameter configurations where each hyperparameter configuration includes a value for each hyperparameter to evaluate such as [s, k, h, α]. The center list includes $n_c$ number of configurations randomly selected from first configuration list.

In an operation 636, a second configuration list is defined that includes $p+\Delta_p e_i$ and $p-\Delta_p e_i$, where p is each configuration on the center list, $\Delta_p$ is the step size value assigned to the $p^{th}$ configuration, and $e_i$ is a predefined decay parameter used in machine learning for optimization. An illustrative value for $e_i$=0.95 such that, as the iteration increases, the search step size becomes smaller to identify an optimal solution.

In an operation 638, child points are generated based on crossover and mutations of the configurations of the configurations on the first configuration list using the GA search method and its associated parameters and a cost value computed from each configuration execution. For example, a paper by Koch et al., *Autotune: A Derivative-free Optimization Framework for Hyperparameter Tuning* KDD 2018 (Aug. 2, 2018) describes a process for generating child points. Each child point is a new configuration of hyperparameter values that includes a value for each hyperparameter to evaluate [s, k, h, α].

In an operation 640, a third configuration list is defined that includes the configurations defined by the child points and included in the second configuration list.

In an operation 642, the third configuration list is updated based on a comparison of each hyperparameter configuration included in the third configuration list with each hyperparameter configuration included in evaluation list 314. For example, each hyperparameter configuration in the third configuration list is compared to previously evaluated hyperparameter configurations to determine if they are "close enough" to hyperparameter configuration values that have already been evaluated, where "close enough" is evaluated based on the cache tolerance value. If so, the hyperparameter configuration is removed from the first configuration list to avoid expending computing resources reevaluating a too similar hyperparameter configuration. The cost function value of the "close" point may be defined as the cost function value of the point removed from the first configuration list in evaluation list 314.

Similar to operation 612, in an operation 644, a single configuration is selected from the third configuration list and assigned to each created session by loading the values in the data structure associated with the selected session.

Similar to operation 614, in an operation 646, each session is requested to execute its assigned hyperparameter configuration based on the parameter values in the data structure. The handle to the session process stored in the data structure associated with the selected session may be used to make this request or call.

Similar to operation 616, in an operation 648, a determination is made concerning whether or not any execution is done. If no execution is done, processing continues in operation 648 until indication that a session is done is received. If any execution is done, processing continues in an operation 650.

Similar to operation 618, in operation 650, results including the cost function value, classification matrix F, and label matrix Y computed from the configuration execution are accessed in association with the set of hyperparameter values defined in the configuration assigned to the session that has completed its computations.

Similar to operation 620, in an operation 652, the results including the cost function value, classification matrix F, and label matrix Y computed from execution of the set of hyperparameter values are stored in evaluation list 314 and in model data 316 in association with the set of hyperparameter values.

Similar to operation 622, in an operation 654, a determination is made concerning whether or not the third configuration list includes another hyperparameter configuration to evaluate that has not been assigned to a session. If the third configuration list includes another hyperparameter configuration to evaluate, processing continues in an operation 656. If the third configuration list does not include another hyperparameter configuration to evaluate, processing continues in an operation 662.

Similar to operation 624, in operation 656, a next hyperparameter configuration is selected from the third configuration list and assigned to the now free session.

Similar to operation 626, in an operation 658, the data structure associated with the now free session is updated to include the next assigned hyperparameter configuration.

Similar to operation 628, in an operation 660, a request is sent to session manager device 400 associated with the now free session to execute model manager application 412 with the hyperparameter configuration included in the data structure, and processing continues in operation 648 to continue to monitor for sessions that have completed their assigned hyperparameter configuration evaluation.

In operation 662, child points are generated based on crossover and mutations of the configurations on the first configuration list using the GA/GSS search method and its associated parameters. The first configuration list is updated to include the generated child points.

Similar to operation 630, in an operation 664, a step size is assigned to each configuration included in the first configuration list using the initial step size value A, and processing continues in an operation 668 shown referring to FIG. 6C.

In operation 668, a hyperparameter configuration p is selected from the center list.

In an operation 670, a determination is made concerning whether $$\min_{y \in \mathcal{T}_p} f(y) < f(p) - \beta \Delta_p^2,$$

where y is a hyperparameter configuration selected from the second configuration list indicated by $\tau_p$, and β is the decrease criterion value. If $$\min_{y \in \mathcal{T}_p} f(y) < f(p) - \beta \Delta_p^2,$$

processing continues in an operation 672. If $$\min_{y \in \mathcal{T}_p} f(y) \geq f(p) - \beta \Delta_p^2,$$

processing continues in an operation 674.

In operation 672, the pattern search about hyperparameter configuration p has been successful, and p=y such that the hyperparameter configuration p is replaced with hyperparameter configuration y in the center list.

In operation 674, the pattern search about hyperparameter configuration p was unsuccessful, and $\Delta_p = \Delta_p/2$ such that the step size for hyperparameter configuration p is reduced by half.

In an operation 676, a determination is made concerning whether or not the center list includes another hyperparameter configuration. If the center list includes another hyperparameter configuration, processing continues in operation 668. If the center list does not include another hyperparameter configuration, processing continues in an operation 678.

In operation 678, a determination is made concerning whether $|\mathcal{R}| \leq n_b$, where $|\mathcal{R}|$ indicates a number of hyperparameter configurations included on evaluation list 314, and $n_b$ is a number of hyperparameter configurations budgeted for processing. If $|\mathcal{R}| \leq n_b$, processing continues in operation 634 to process additional hyperparameter configurations. If $|\mathcal{R}| > n_b$, processing continues in an operation 680.

In operation 680, the hyperparameter configuration that resulted in the smallest cost function value is selected from evaluation list 314 and is indicated as [$s^o$, $k^o$, $h^o$, $\alpha^o$]. The cost function value is a total loss/entropy value C computed in an operation 730 for a hyperparameter configuration.

In an operation 682, an optimized label matrix $Y^o$ is computed using classification matrix F and label matrix Y associated with the hyperparameter configuration selected in operation 680, and an integer programming problem solver where $$y^0 = \operatorname{argmax} \frac{\mu^o}{2} \sum_{i=1}^n \sum_{j=1}^c F_{i,j} y_{i,j}$$

subject to label matrix Y, where n is a number of observation vectors in input classified data 414 and in the unclassified data, and $$\mu^o = \frac{1}{\alpha^o} - 1,$$

where $\alpha^o$ is the weight value $\alpha$ associated with the smallest cost function value in operation 680. Note that the initial label matrix Y includes the input classified data 414 and the batch size $h^o$ number of additionally labeled observation vectors, whereas optimized label matrix $Y^o$ includes a label assigned to each observation vector based on the optimization. The initial label matrix Y are constraints when solving the optimization problem. For illustration, the integer programming problem solver may be designed to solve a 0-1 knapsack problem, for example, as described in Knapsack problem printed on Feb. 26, 2020 from https://en.wikipedia.org/wiki/Knapsack_problem.

The optimization results in a first loss value computed as $$C_1 = \frac{\mu^o}{2} \sum_{i=1}^n \|F_i - Y_i\|^2.$$

When $F_{i,i}$ and $Y_{i,i}$ are too large for selection manager 104 to process, selection manager 104 may select a session to perform the optimization and request that the selected session perform the optimization and store the resulting optimized label matrix $Y^o$, and the first loss value in association with [$s^o$, $k^o$, $h^o$, $\alpha^o$].

In an operation 684, a Euclidian distance d is computed between [$s^o$, $k^o$, $h^o$, $\alpha^o$] and [$s_p^o$, $k_p^o$, $h_p^o$, $\alpha_p^o$], where [$s_p^o$, $k_p^o$, $h_p^o$, $\alpha_p^o$] are the optimized values that resulted from a previous iteration of operations 610 to 682.

In an operation 686, a determination is made concerning whether $|d-d_p| \leq c_s$, where $c_s$ is the search convergence value indicated in operation 532. When $|d-d_p| \leq c_s$, processing continues in an operation 688 to process additional hyperparameter configurations. When $|d-d_p| > c_s$, processing continues in an operation 696 to compute an additional optimized hyperparameter configuration. Of course, operation 686 may also include a test that confirms that the current iteration of operation 686 is not the first because there are no initial values for [$s_p^o$, $h_p^o$, $k_p^o$, $\mu_p^o$] or for $d_p$.

In operation 688, [$s_p^o$, $k_p^o$, $h_p^o$, $\alpha_p^o$] is replaced with [$s^o$, $k^o$, $h^o$, $\alpha^o$], and the current Euclidian distance d is stored as a previous Euclidian distance $d_p$ for comparison on a next iteration of operation 686.

In an operation 690, input classified data 414 is updated to include the batch size $h^o$ number of additionally labeled observation vectors.

In an operation 692, the batch size $h^o$ number of additionally labeled observation vectors are removed from the input unclassified data.

In operation 694, the input unclassified data is randomly allocated to each session to replace the previous allocation. A copy of the updated input classified data 414 is provided to each session as well.

In operation 696, an indicator that processing is complete may be returned to user device 200. The optimized label matrix $Y^o$ may be stored in classification output data 416 and/or classification output data 436. The observation vectors in input classified data 414 and/or input unclassified data subset 415 and/or input unclassified data subset 434 may further be stored in classification output data 416 and/or classification output data 436 in association with a respective value for the target variable included in the optimized label matrix $Y^o$. The optimized label matrix $Y^o$ includes a label or class defined for each observation vector included in the input unclassified data. [$s^o$, $k^o$, $h^o$, $\alpha^o$] further may be stored in selected model data 318 as the selected hyperparameters for classifying input unclassified data subset 415 and/or input unclassified data subset 434.

Hyperparameter selection system 100 predicts the label/class, target variable y, for unclassified observation vectors in input unclassified data subset 415 and/or input unclassified data subset 434, where unclassified observation vectors were not labeled by an expert process or a human while determining the optimum values for the hyperparameters. Hyperparameter selection system 100 supports improved classification accuracy performance in a faster manner using the plurality of worker computing devices of worker system 106 that perform operations on their portion of input unclassified data subset 415 or input unclassified data subset 434. Input classified data 414 is used at all of the computing devices of worker system 106. Selection manager device 104 controls the execution using different values of the hyperparameters by the plurality of worker computing devices of worker system 106. Hyperparameter selection system 100 can be applied to computer vision, machine learning, pattern recognition, etc. In the application of medical imaging diagnosis, there may be a large number of unlabeled medical images that are distributed due to their geographic locations.

Supervised learning requires that the target (dependent) variable y be classified or labeled in training data so that a model can be built to predict the class of new unclassified data. Currently, supervised learning systems discard observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset of sufficient size to develop an accurate predictive model. Hyperparameter selection system 100 solves this problem by providing a cost effective, accurate, and fast process for classifying unclassified data while improving the accuracy of the classification by identifying optimum values for the hyperparameters. Classification output data 416 and/or classification output data 436 provides observation vectors for training a predictive model that previously would have been discarded resulting in improved models and more accurate predictions as shown in the results presented below.

Referring to FIG. 7, example operations associated with model manager application 412 and/or model worker application 432 in executing a hyperparameter configuration to compute the cost function value, classification matrix F, and label matrix Y are described. Additional, fewer, or different operations may be performed depending on the embodiment. The order of presentation of the operations of FIG. 7 is not intended to be limiting.

Referring to FIG. 7, in an operation 700, a request for execution is received from selection manager device 104. The data describing the process including the hyperparameter configuration is accessed. For example, data in the data structure associated with the thread is accessed. Alternatively, the values may be included with the request or provided in other manners to the session. The request may be received as a result of execution of any of operations 614, 624, 646, or 660.

In an operation 702, an affinity matrix W is computed based on the kernel function indicated in operation 518 and the kernel parameter value s in the assigned hyperparameter configuration. For example, using the Gaussian kernel function, the affinity matrix W is defined as $$W_{ij} = \exp\frac{-\|x_i - x_j\|^2}{2s^2} \text{ if } i \neq j$$

and $W_{ii}=0$ if i=j, i=1, . . . , n and j=1, . . . , n where $x_i$ and $x_j$ are observation vectors selected from input classified data 414 and input unclassified data subset 434 (or input unclassified data subset 415 when session manager device 400 is executing the operations of FIG. 7), and n is a number of observation vectors included in input classified data 414 and input unclassified data subset 434 (or input unclassified data subset 415 when session manager device 400 is executing the operations of FIG. 7). For illustration, where the KNN kernel function is selected, k observation vectors are selected based on having minimum affinity matrix W values, where the kernel parameter value k is included in the assigned hyperparameter configuration. Only the selected k observation vectors are included in the affinity matrix W.

In an operation 704, a diagonal matrix D is computed based on the affinity matrix W. For example, using the Gaussian kernel function, the diagonal matrix D is an n×n matrix and is defined as $$D_{ii} = \sum_{j=1}^{n} W_{ij} \text{ if } i = j$$

and $D_{ij}=0$ if i≠j, i=1, . . . , n and j=1, . . . , n.

In an operation 706, a normalized distance matrix S is computed based on the affinity matrix W and the diagonal matrix D. For example, the normalized distance matrix S is an n×n matrix and is defined as $S=D^{-1/2} WD^{-1/2}$.

In an operation 708, a label matrix Y is defined. Label matrix Y is an n×c matrix with $Y_{ig}=1$ if $x_i$ is labeled as $y_i=g$. Otherwise, $Y_{ig}=0$, where g=1, . . . , c, i=1, . . . , n.

In an operation 710, a classification matrix F and one or more labeling convergence parameter values are initialized. Classification matrix F is an n×c matrix. For example, classification matrix F is initialized as F(0)=Y. One or more labeling convergence parameter values may be initialized based on the labeling convergence test indicated from operation 526. As an example, when the labeling convergence test "Num Iterations" is indicated from operation 526, a first labeling convergence parameter value t may be initialized to zero and associated with the number of iterations $M_L$ so that first labeling convergence parameter value t can be compared to the number of iterations $M_L$ to determine convergence by the labeling convergence test. Classification matrix F defines a label probability distribution matrix for each observation vector $x_i$. As another example, when the labeling convergence test "Within Tolerance" is indicated from operation 526, a first labeling convergence parameter value ΔF may be initialized to a large number and associated with the tolerance value τ. Either or both convergence tests may be applied. Other convergence tests may further be applied.

In an operation 712, an updated classification matrix F(t+1) is computed using F(t+1)=αSF(t)+(1−α)Y, where for a first iteration of operation 434, F(t)=F(0), where a is defined in the assigned hyperparameter configuration. The updated classification matrix F defines a label probability for each permissible value defined in label set Q for each observation vector $x_i$.

in an operation 714, the one or more labeling convergence parameter values are updated. As an example, when the labeling convergence test "Num Iterations" is indicated in operation 526, t=t+1. As another example, when the labeling convergence test "Within Tolerance" is indicated in operation 526, ΔF=F(t+1)−F(t).

In an operation 716, a determination is made concerning whether or not labeling has converged by evaluating the labeling convergence test. When labeling has converged, processing continues in an operation 718. When labeling has not converged, processing continues in operation 712 to compute a next update of classification matrix F(t+1). As an example, when the labeling convergence test "Num Iterations" is indicated in operation 526, the first labeling convergence parameter value t is compared to the labeling convergence test value that is the number of iterations $M_L$. When $t \geq M_L$, labeling has converged. As another example, when the labeling convergence test "Within Tolerance" is indicated in operation 526, the first labeling convergence parameter value $\Delta F$ is compared to the labeling convergence test value that is the tolerance value $\tau$. When $\Delta F \leq \tau$, labeling has converged. $M_L$ and/or $\tau$ may also be indicated in operation 526 as the classification convergence values.

In operation 718, the $y_i$-variable (target) value of each observation vector $x_i$ not included in input classified data 414 is labeled using $F(t)$. $y_i$ is selected for each observation vector $x_i$ based on $$y_i = \underset{j \leq c}{\mathrm{argmax}} F_{ij}(t), i = 1, \ldots, n_u,$$

where $n_u$ is a number of observation vectors included in input unclassified data subset 434 (or input unclassified data subset 415 when session manager device 400 is executing the operations of FIG. 7). As a result, a label with a highest classification value as indicated by $$\underset{j \leq c}{\mathrm{argmax}} F_{ij}(t)$$

is selected as the $y_i$-variable (target) value or label for the observation vector $x_i$.

In an operation 720, a determination is made concerning whether or not supplemental labeling is done. When supplemental labeling is done, processing continues in operation 730. When supplemental labeling is not done, processing continues in an operation 722. For example, supplemental labeling is done on a second iteration of 720.

In operation 722, a k-means clustering algorithm is applied to updated classification matrix $F(t+1)$ to create a number of clusters equal to the number of classes c included in input classified data 414. The k-means clustering algorithm assigns the classification label distribution of each observation vector to a cluster.

In an operation 724, an entropy value is computed for each observation vector using $$C = -\sum_{j=1}^{c} F_{ij}(t+1) \log(F_{ij}(T+1)), i = 1, \ldots, n$$

to define an entropy matrix C.

In an operation 726, l number of observation vectors are selected from each cluster of the number of clusters c by identifying the l observation vectors having maximum entropy values defined in entropy matrix C, where l=[h/c] is a largest integer that is not larger than h/c. An index q to the observation vector $x_i$ of input unclassified data subset 434 (or input unclassified data subset 415 when session manager device 400 is executing the operations of FIG. 7) associated with each observation vector may be identified as part of the selection. C is an effective measure of class overlap, which characterizes the usefulness of the unclassified data when classification is ambiguous or uncertain. Because the selection of the additional batch size h number of classified observation vectors is conducted within local clusters, the additional batch size h number of classified observation vectors are expected to be selected from different classes instead of choosing most of them from a majority class, which ensures the best trade-off between diversity and uncertainty in active learning.

In an operation 728, the label $$y_q = \underset{j \leq c}{\mathrm{argmax}} F_{qj}(t), q = 1, \ldots, l*c$$

is assigned to the $y_q$-variable (target) value of the associated observation vector $x_q$, and the associated observation vector $x_q$ with its label $y_q$ is added to input classified data 414. The label matrix Y is updated to include the labels and associated observation vectors. As a result, the number of classified observation vectors has been increased by l*c and the number of unclassified observation vectors has been decreased by l*c by removing them from input unclassified data subset 434 (or input unclassified data subset 415 when session manager device 400 is executing the operations of FIG. 7). Processing continues in operation 710 to recompute classification matrix F and label matrix Y with the additional l*c number of classified observation vectors.

In operation 730, a second loss value $C_2$, an entropy loss value $C_e$, and a total loss/entropy value C are computed, for example, using $$C_2 = \frac{1}{2} \sum_{i=1}^{n} \sum_{j=1}^{n} W_{i,j} \left\| \frac{1}{\sqrt{D_{i,i}}} F_i - \frac{1}{\sqrt{D_{j,j}}} F_j \right\|^2,$$

$$C_e = -\lambda \sum_{q=1}^{l*c} C_q \text{ and } C = C_2 + C_e,$$

where $\lambda$ is the strength of entropy regularization parameter value indicated in operation 512, and $C_q$ is the entropy value computed for each observation vector selected in operation 728.

In an operation 732, a completion indicator of the data structure is set to notify selection manager device 104 that processing of the hyperparameter configuration is complete. The total loss/entropy value C, updated classification matrix $F(t+1)$, and updated label matrix Y are made available to selection manager device 104, for example, by including them in the data structure and/or updating a globally accessible table and/or storing them in model configuration data 418 and/or in model configuration data 440.

Experimental results are shown in FIGS. 8A to 18. In FIGS. 8A to 12C, hyperparameter selection system 100 was executed using 139 machines where each machine used 32 threads. The input parameters were s=[0.001, 1000, 5], h=[1, 30, 2], k=[1, 100, 2], μ=[0, 10, 0.1] where the first value is a minimum value, the second value is a maximum value, and the third value is a step size value to search, $\lambda$=0.5, $\alpha$=0.4, $c_s$=0.1, $M_L$=100. Both the Gaussian kernel function and the kNN kernel function were used and the best results are shown in the figures.

10 different Monte Carol runs were made with each method discussed below and the average of the 10 results using each method are shown in the figures except for the method referred to as the DAL method. Using the DAL method, the hyperparameters were randomly selected and the results shown are an average of 20 executions.

Referring to FIG. 8A, an accuracy as a function of a percentage of input classified data 414 to the unclassified data using a first dataset is shown in accordance with an illustrative embodiment. The percentage of input classified data 414 to the unclassified data varies between 0.1% to 20%. The results were generated using 139 machines where each machine is running with 32 threads. An accuracy curve 800 shows the accuracy computed using hyperparameter selection system 100 with s=[0.001, 1000, 5], h=[1, 30, 2], k=[1, 100, 2], µ=[0, 10, 0.1], λ=0.5, α=0.4, $c_s$=0.1, $M_L$=100. The Gaussian kernel function were used.

An accuracy curve 802 shows the accuracy computed using the method described in U.S. Pat. No. 10,275,690 denoted the DAL method. An accuracy curve 804 shows the accuracy computed using an existing method denoted Auto-sklearn described in M. Jfeurer et al., "Efficient and Robust Automated Machine Learning", Neural Information Processing Systems (NIPS) 2015 with a one minute running time. An accuracy curve 806 shows the accuracy computed using an existing method denoted the Auto-WEKA method described in C. Thornton et al., "Auto-weka: Combined selection and hyperparameter optimization of classification algorithm", KDD 2013. An accuracy curve 808 shows the accuracy computed using an existing method denoted the ASSL method described in Y. Li, "Towards Automated Semi-supervised Learning", AAAI conference on Artificial Intelligence, 2019. An accuracy curve 810 shows the accuracy computed using an existing method denoted the AER method described in W. Fu et al., Scalable Active Learning by Approximated Error Reduction, K D D 2018. An accuracy curve 812 shows the accuracy computed using an existing method denoted the USDM method described in Y. Yang, "Multiclass active learning by uncertainty sampling with diversity maximization", International Journal of Computer Vision. Accuracy curve 800 shows that hyperparameter selection system 100 achieved a higher accuracy than any other method for the percentage of input classified data 414 to the unclassified data varies between 0.1% to 20%.

Referring to FIG. 8B, a histogram of an accuracy for a percentage of input classified data 414 to the unclassified of data 1% using the first dataset is shown in accordance with an illustrative embodiment. A first bin 820 shows the accuracy computed using hyperparameter selection system 100; a second bin 822 shows the accuracy computed using the DAL method; a third bin 824 shows the accuracy computed using the Auto-sklearn method; a fourth bin 826 shows the accuracy computed using the Auto-WEKA method; a fifth bin 828 shows the accuracy computed using the ASSL method; a sixth bin 830 shows the accuracy computed using the AER method; and a seventh bin 832 shows the accuracy computed using the USDM method. First bin 800 shows that hyperparameter selection system 100 achieved an accuracy of greater than 90% that was higher than any of the other methods.

Figure 8C:
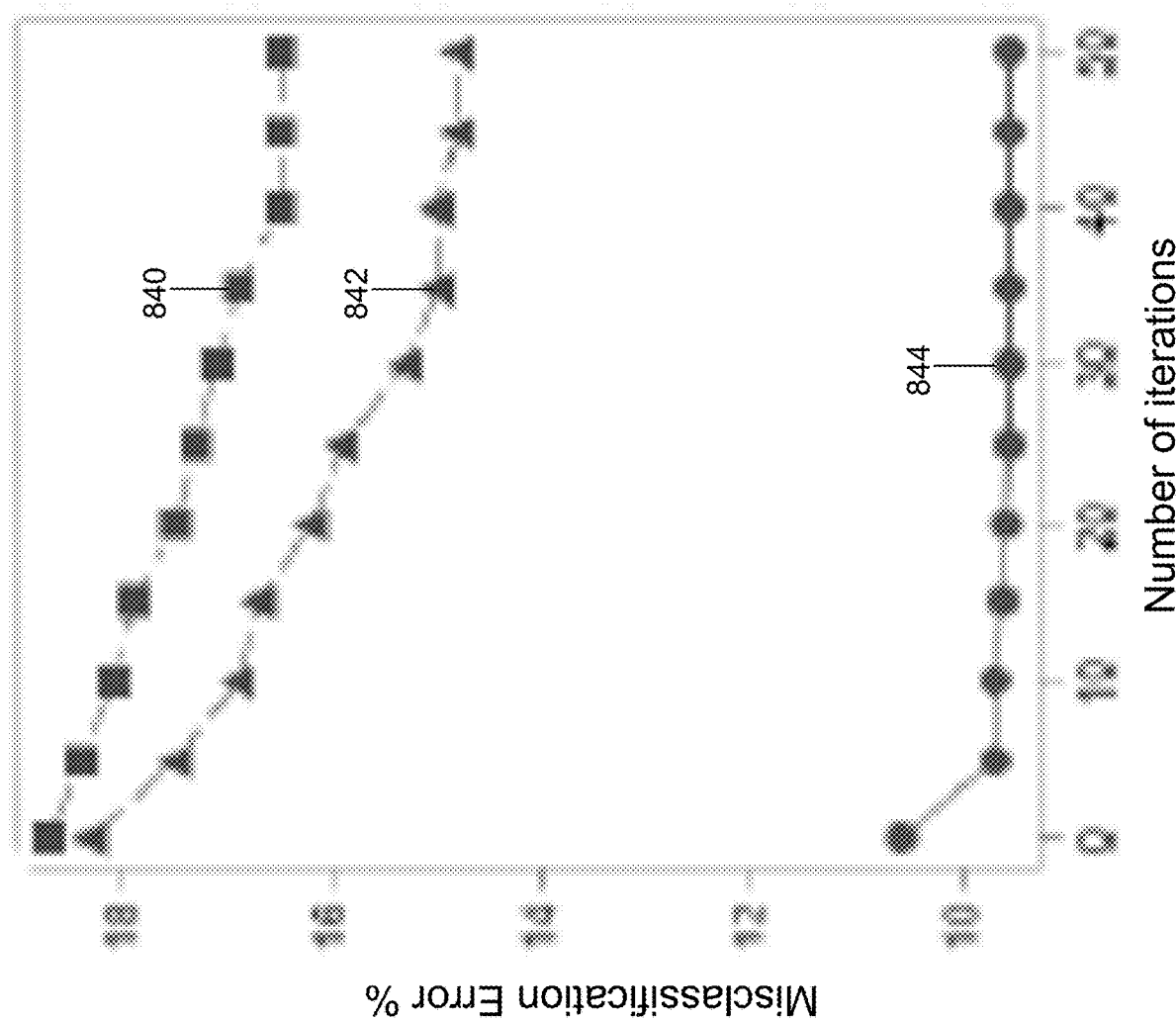

Referring to FIG. 8C, a misclassification error is shown as a function of a number of iterations using the first dataset in accordance with an illustrative embodiment. A misclassification error curve 840 shows the misclassification error computed using the Auto-WEKA method. A misclassification error curve 842 shows the misclassification error computed using the Auto-sklearn method. A misclassification error curve 844 shows the misclassification error computed using hyperparameter selection system 100. Misclassification error curve 844 shows that hyperparameter selection system 100 provides a significantly lower error after just one iteration.

Figure 9B:
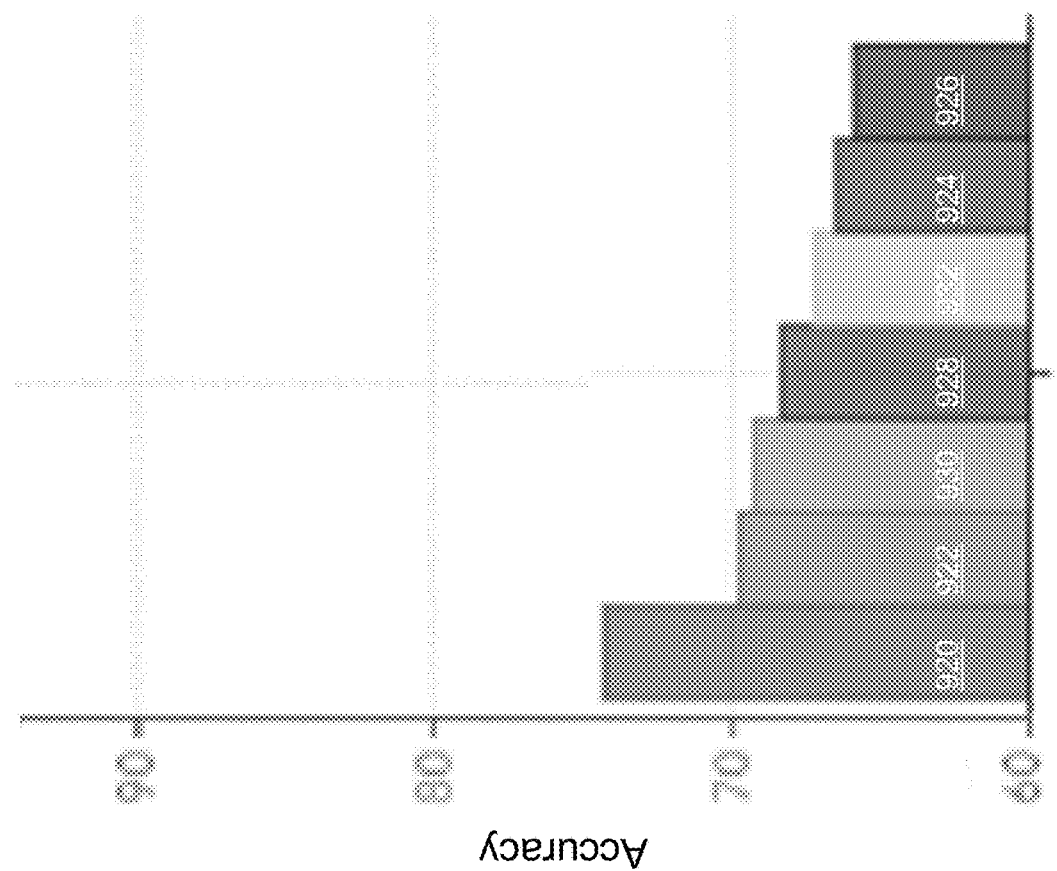
FIGS. 9A to 9C provide accuracy and misclassification error comparisons between multiple classification methods using a second dataset in accordance with an illustrative embodiment.
Figure 9A:
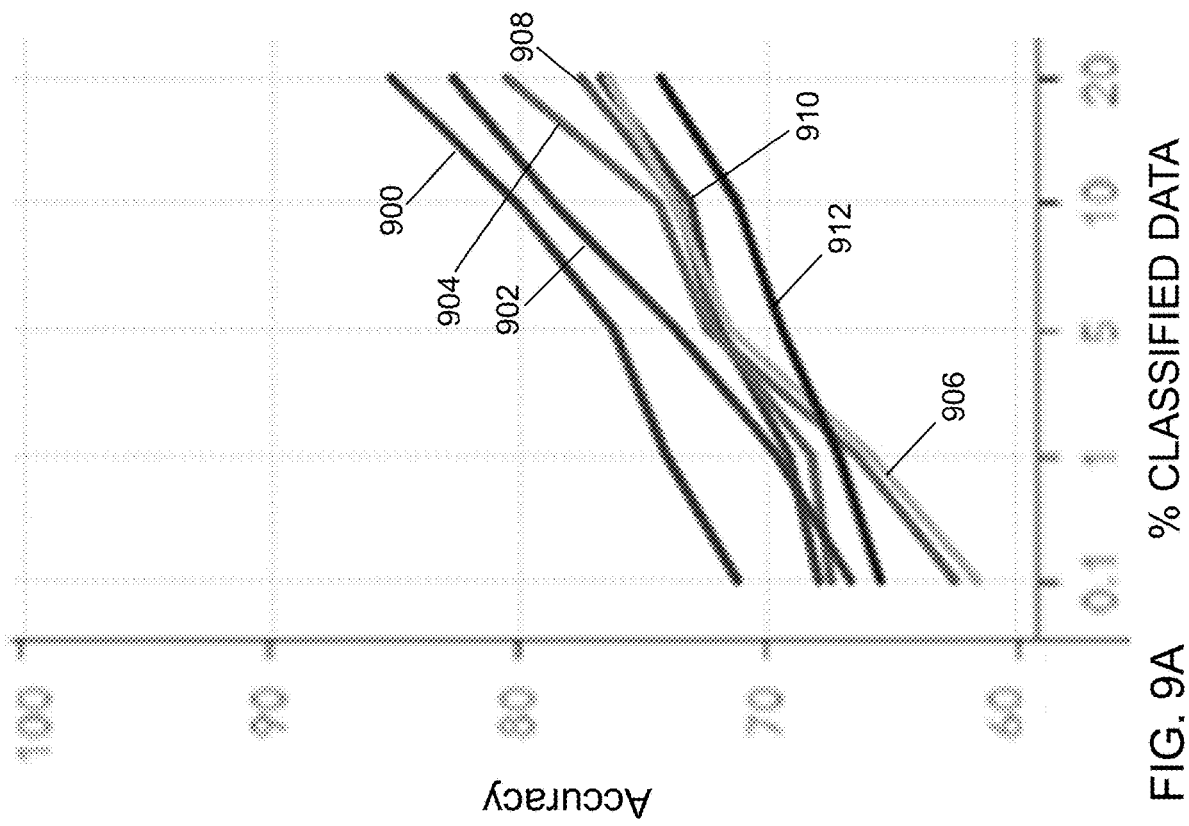

Referring to FIG. 9A, an accuracy as a function of a percentage of input classified data 414 to the unclassified data using a second dataset is shown in accordance with an illustrative embodiment. An accuracy curve 900 shows the accuracy computed using hyperparameter selection system 100. An accuracy curve 902 shows the accuracy computed using the DAL method. An accuracy curve 904 shows the accuracy computed using the Auto-sklearn method. An accuracy curve 906 shows the accuracy computed using the Auto-WEKA method. An accuracy curve 908 shows the accuracy computed using the ASSL method. An accuracy curve 910 shows the accuracy computed using the AER method. An accuracy curve 912 shows the accuracy computed using the USDM method. Accuracy curve 900 shows that hyperparameter selection system 100 achieved a higher accuracy than any other method for the percentage of input classified data 414 to the unclassified data varies between 0.1% to 20%.

Referring to FIG. 9B, a histogram of an accuracy for a percentage of input classified data 414 to the unclassified of data 1% using the second dataset is shown in accordance with an illustrative embodiment. A first bin 920 shows the accuracy computed using hyperparameter selection system 100; a second bin 922 shows the accuracy computed using the DAL method; a third bin 924 shows the accuracy computed using the Auto-sklearn method; a fourth bin 926 shows the accuracy computed using the Auto-WEKA method; a fifth bin 928 shows the accuracy computed using the ASSL method; a sixth bin 930 shows the accuracy computed using the AER method; and a seventh bin 932 shows the accuracy computed using the USDM method. First bin 900 shows that hyperparameter selection system 100 achieved an accuracy of ~75% that was much higher than any of the other methods.

Figure 9C:
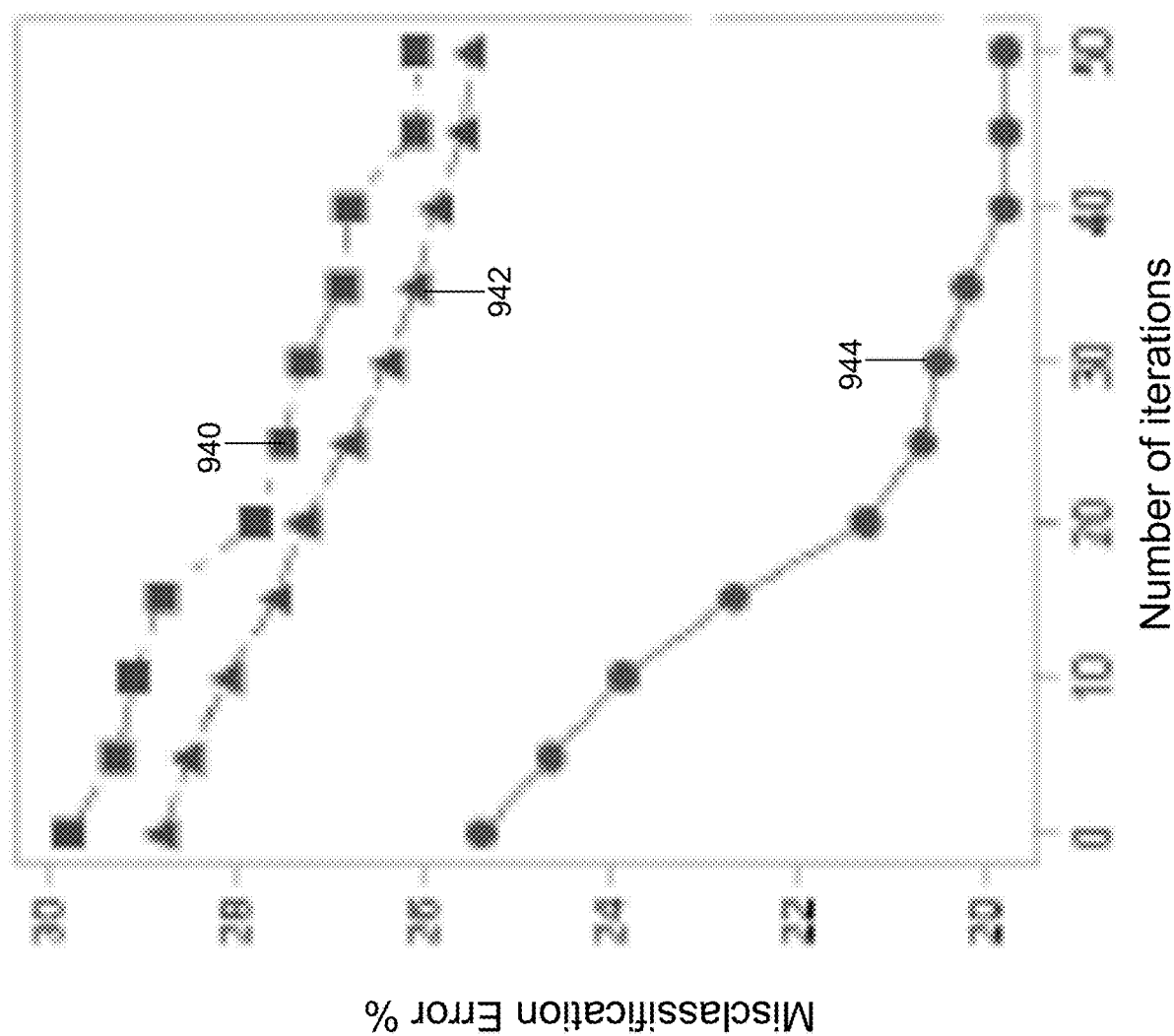

Referring to FIG. 9C, a misclassification error is shown as a function of a number of iterations using the second dataset in accordance with an illustrative embodiment. A misclassification error curve 940 shows the misclassification error computed using the Auto-WEKA method. A misclassification error curve 942 shows the misclassification error computed using the Auto-sklearn method. A misclassification error curve 944 shows the misclassification error computed using hyperparameter selection system 100. Misclassification error curve 944 shows that hyperparameter selection system 100 provides a significantly lower error after just one iteration.

Referring to FIG. 10A, an accuracy as a function of a percentage of input classified data 414 to the unclassified data using a third dataset is shown in accordance with an illustrative embodiment. An accuracy curve 1000 shows the accuracy computed using hyperparameter selection system. An accuracy curve 1002 shows the accuracy computed using the DAL method. An accuracy curve 1004 shows the accuracy computed using the Auto-sklearn method. An accuracy curve 1006 shows the accuracy computed using the Auto-WEKA method. An accuracy curve 1008 shows the accuracy computed using the ASSL method. An accuracy curve 1010 shows the accuracy computed using the AER method. An accuracy curve 1012 shows the accuracy computed using the USDM method. Accuracy curve 1000 shows that hyperparameter selection system 100 achieved a higher accuracy than any other method for the percentage of input classified data 414 to the unclassified data varies between 0.1% to 5% and a higher accuracy than all but the Auto-sklearn method for the percentage of input classified data 414 to the unclassified data varies from 10% to 20%.

Referring to FIG. 10B, a histogram of an accuracy for a percentage of input classified data 414 to the unclassified of data 1% using the third dataset is shown in accordance with an illustrative embodiment. A first bin 1020 shows the accuracy computed using hyperparameter selection system 100; a second bin 1022 shows the accuracy computed using the DAL method; a third bin 1024 shows the accuracy computed using the Auto-sklearn method; a fourth bin 1026 shows the accuracy computed using the Auto-WEKA method; a fifth bin 1028 shows the accuracy computed using the ASSL method; a sixth bin 1030 shows the accuracy computed using the AER method; and a seventh bin 1032 shows the accuracy computed using the USDM method. First bin 1000 shows that hyperparameter selection system 100 achieved an accuracy of ~79% that was much higher than any of the other methods.

Figure 10C:
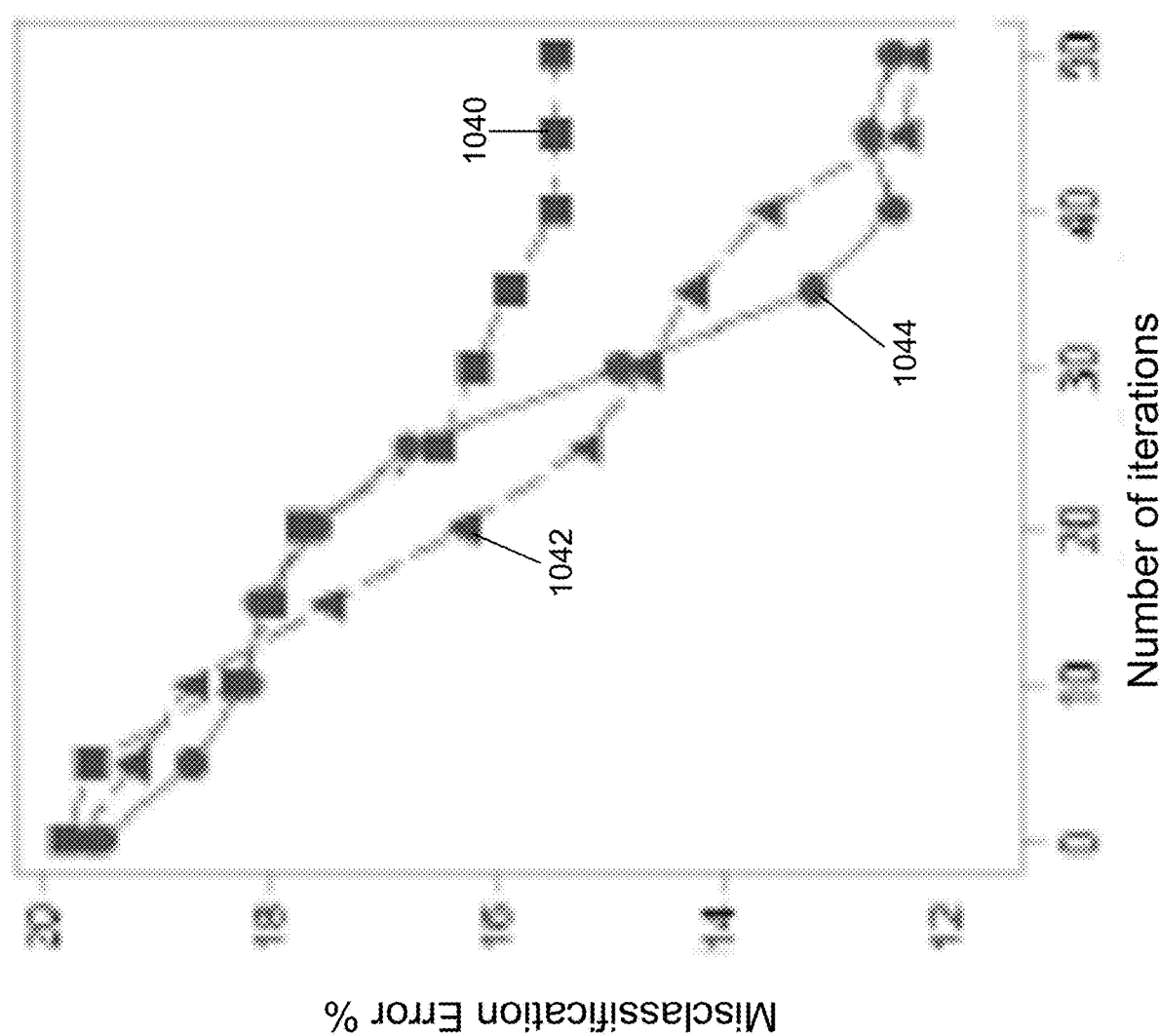

Referring to FIG. 10C, a misclassification error is shown as a function of a number of iterations using the third dataset in accordance with an illustrative embodiment. A misclassification error curve 1040 shows the misclassification error computed using the Auto-WEKA method. A misclassification error curve 1042 shows the misclassification error computed using the Auto-sklearn method. A misclassification error curve 1044 shows the misclassification error computed using hyperparameter selection system 100.

Figure 11B:
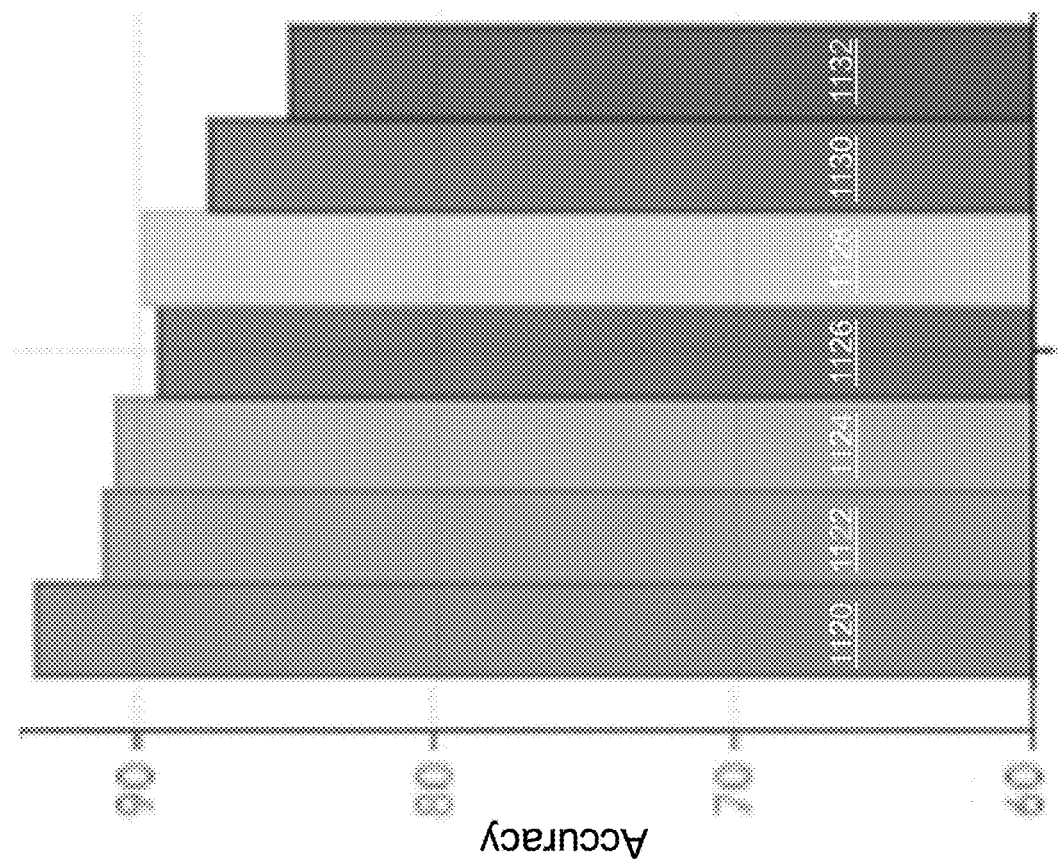
FIGS. 11A to 11C provide accuracy and misclassification error comparisons between multiple classification methods using a fourth dataset in accordance with an illustrative embodiment.
Figure 11A:
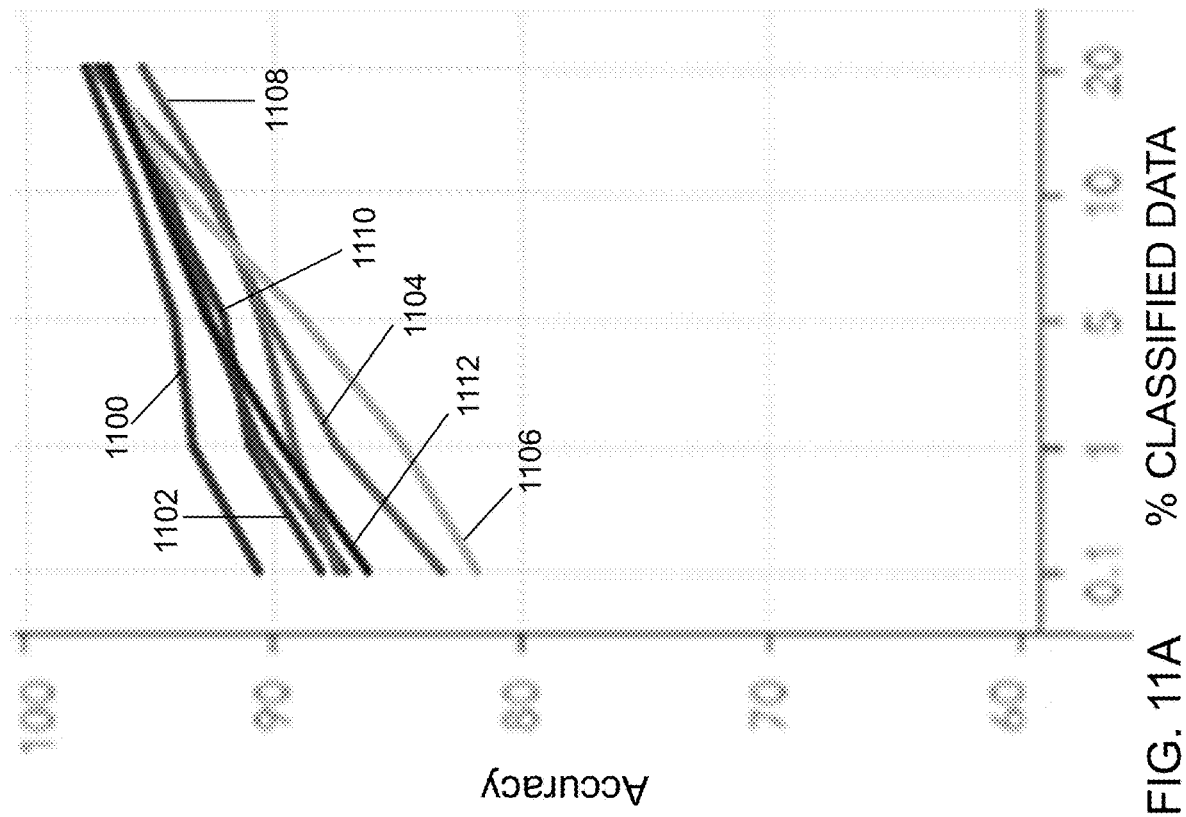

Referring to FIG. 11A, an accuracy as a function of a percentage of input classified data 414 to the unclassified data using a fourth dataset is shown in accordance with an illustrative embodiment. An accuracy curve 1100 shows the accuracy computed using hyperparameter selection system 100. An accuracy curve 1102 shows the accuracy computed using the DAL method. An accuracy curve 1104 shows the accuracy computed using the Auto-sklearn method. An accuracy curve 1106 shows the accuracy computed using the Auto-WEKA method. An accuracy curve 1108 shows the accuracy computed using the ASSL method. An accuracy curve 1110 shows the accuracy computed using the AER method. An accuracy curve 1112 shows the accuracy computed using the USDM method. Accuracy curve 1100 shows that hyperparameter selection system 100 achieved a higher accuracy than any other method for the percentage of input classified data 414 to the unclassified data varies between 0.1% to 20%.

Referring to FIG. 11B, a histogram of an accuracy for a percentage of input classified data 414 to the unclassified of data 1% using the fourth dataset is shown in accordance with an illustrative embodiment. A first bin 1120 shows the accuracy computed using hyperparameter selection system 100; a second bin 1122 shows the accuracy computed using the DAL method; a third bin 1124 shows the accuracy computed using the Auto-sklearn method; a fourth bin 1126 shows the accuracy computed using the Auto-WEKA method; a fifth bin 1128 shows the accuracy computed using the ASSL method; a sixth bin 1130 shows the accuracy computed using the AER method; and a seventh bin 1132 shows the accuracy computed using the USDM method. First bin 1100 shows that hyperparameter selection system 100 achieved an accuracy of greater than 90% that was much higher than any of the other methods.

Figure 11C:
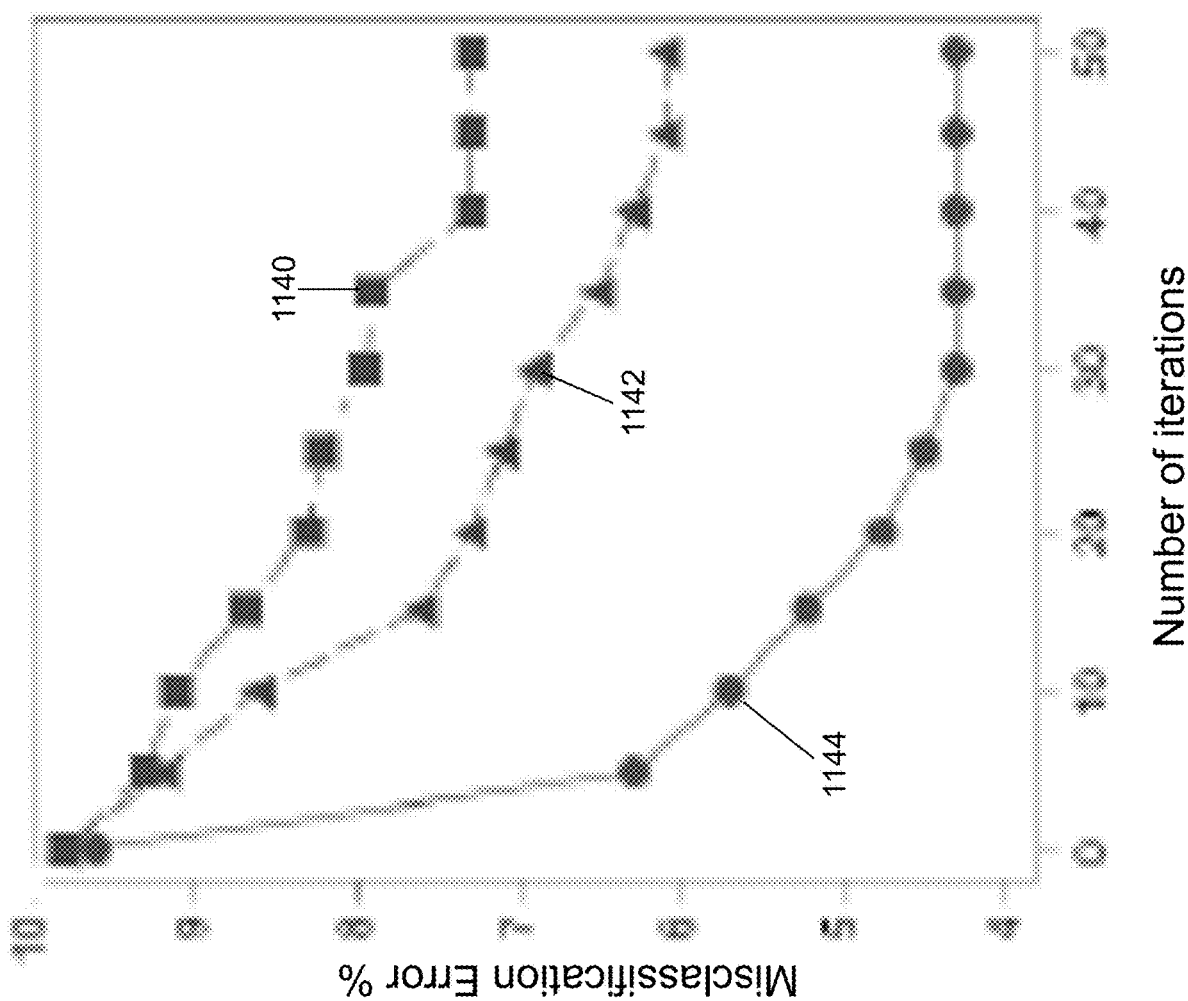

Referring to FIG. 11C, a misclassification error is shown as a function of a number of iterations using the fourth dataset in accordance with an illustrative embodiment. A misclassification error curve 1140 shows the misclassification error computed using the Auto-WEKA method. A misclassification error curve 1142 shows the misclassification error computed using the Auto-sklearn method. A misclassification error curve 1144 shows the misclassification error computed using hyperparameter selection system 100. Misclassification error curve 1144 shows that hyperparameter selection system 100 provides a significantly lower error after just five iterations.

Figure 12B:
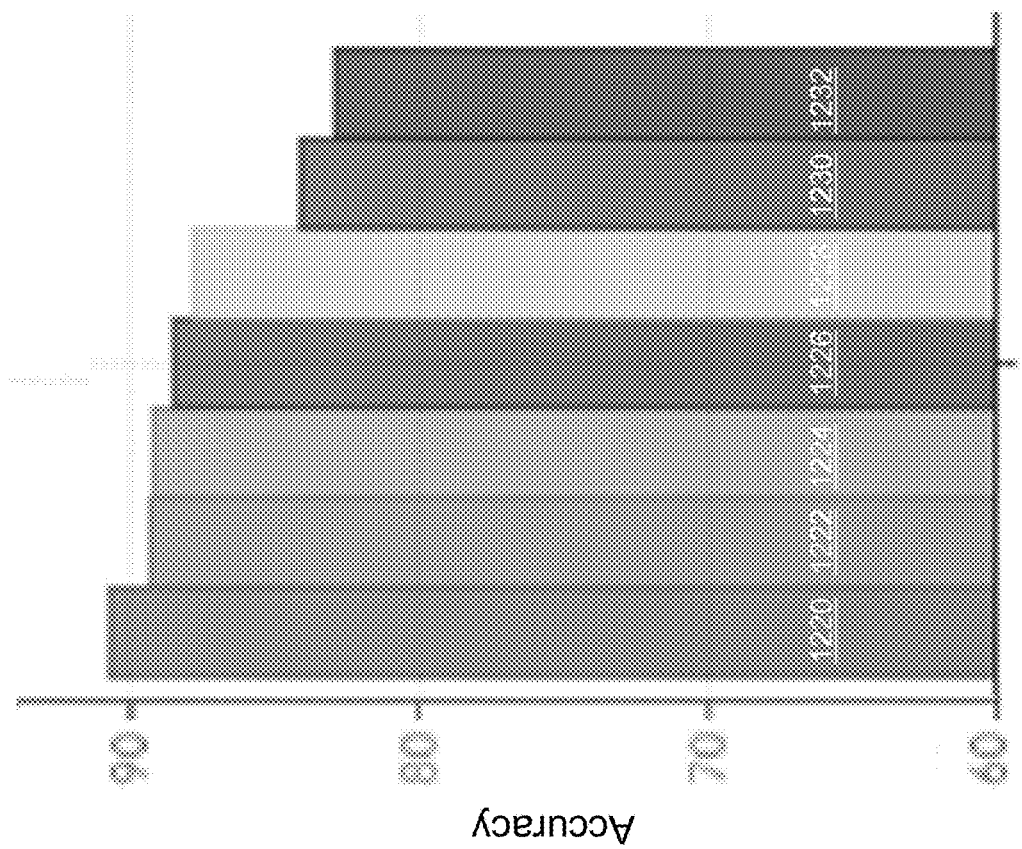
FIGS. 12A to 12C provide accuracy and misclassification error comparisons between multiple classification methods using a fifth dataset in accordance with an illustrative embodiment.
Figure 12A:
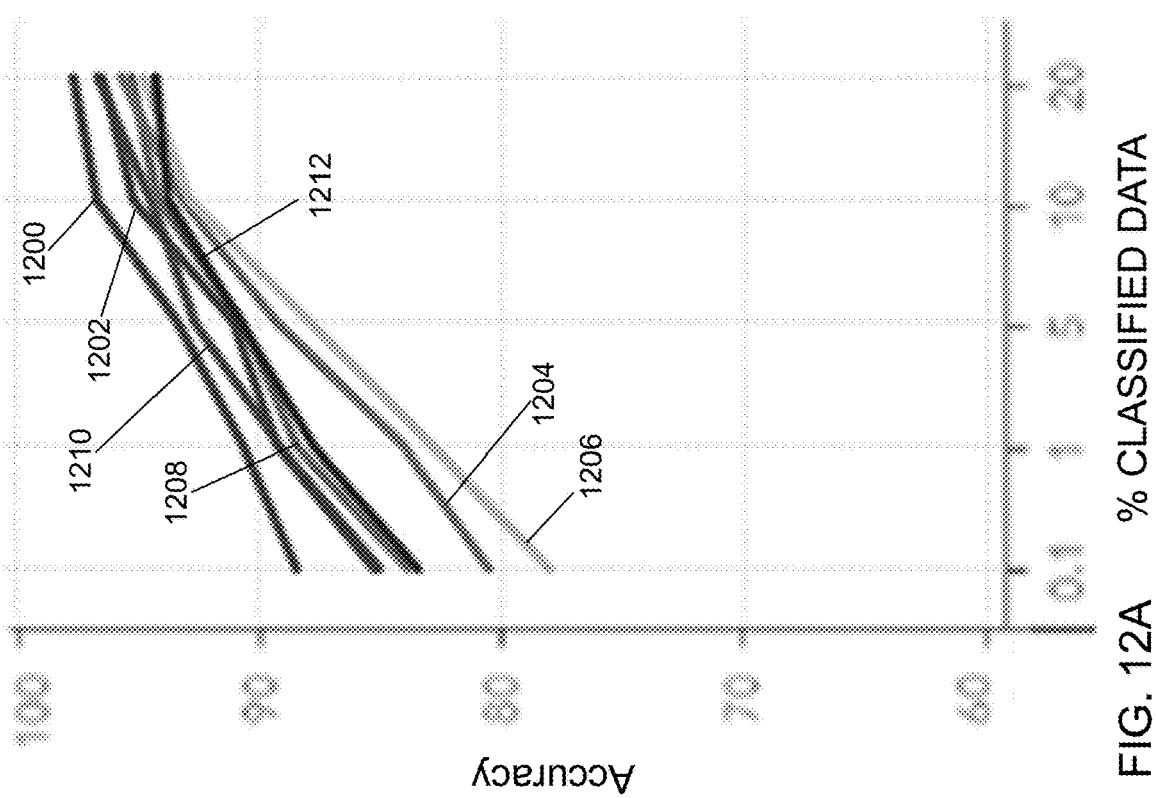

Referring to FIG. 12A, an accuracy as a function of a percentage of input classified data 414 to the unclassified data using a fourth dataset is shown in accordance with an illustrative embodiment. An accuracy curve 1200 shows the accuracy computed using hyperparameter selection system 100. An accuracy curve 1202 shows the accuracy computed using the DAL method. An accuracy curve 1204 shows the accuracy computed using the Auto-sklearn method. An accuracy curve 1206 shows the accuracy computed using the Auto-WEKA method. An accuracy curve 1208 shows the accuracy computed using the ASSL method. An accuracy curve 1210 shows the accuracy computed using the AER method. An accuracy curve 1212 shows the accuracy computed using the USDM method. Accuracy curve 1200 shows that hyperparameter selection system 100 achieved a higher accuracy than any other method for the percentage of input classified data 414 to the unclassified data varies between 0.1% to 20%.

Referring to FIG. 12B, a histogram of an accuracy for a percentage of input classified data 414 to the unclassified of data 1% using the fifth dataset is shown in accordance with an illustrative embodiment. A first bin 1220 shows the accuracy computed using hyperparameter selection system 100; a second bin 1222 shows the accuracy computed using the DAL method; a third bin 1224 shows the accuracy computed using the Auto-sklearn method; a fourth bin 1226 shows the accuracy computed using the Auto-WEKA method; a fifth bin 1228 shows the accuracy computed using the ASSL method; a sixth bin 1230 shows the accuracy computed using the AER method; and a seventh bin 1232 shows the accuracy computed using the USDM method. First bin 1200 shows that hyperparameter selection system 100 achieved an accuracy of greater than 90% that was higher than any of the other methods.

Figure 12C:
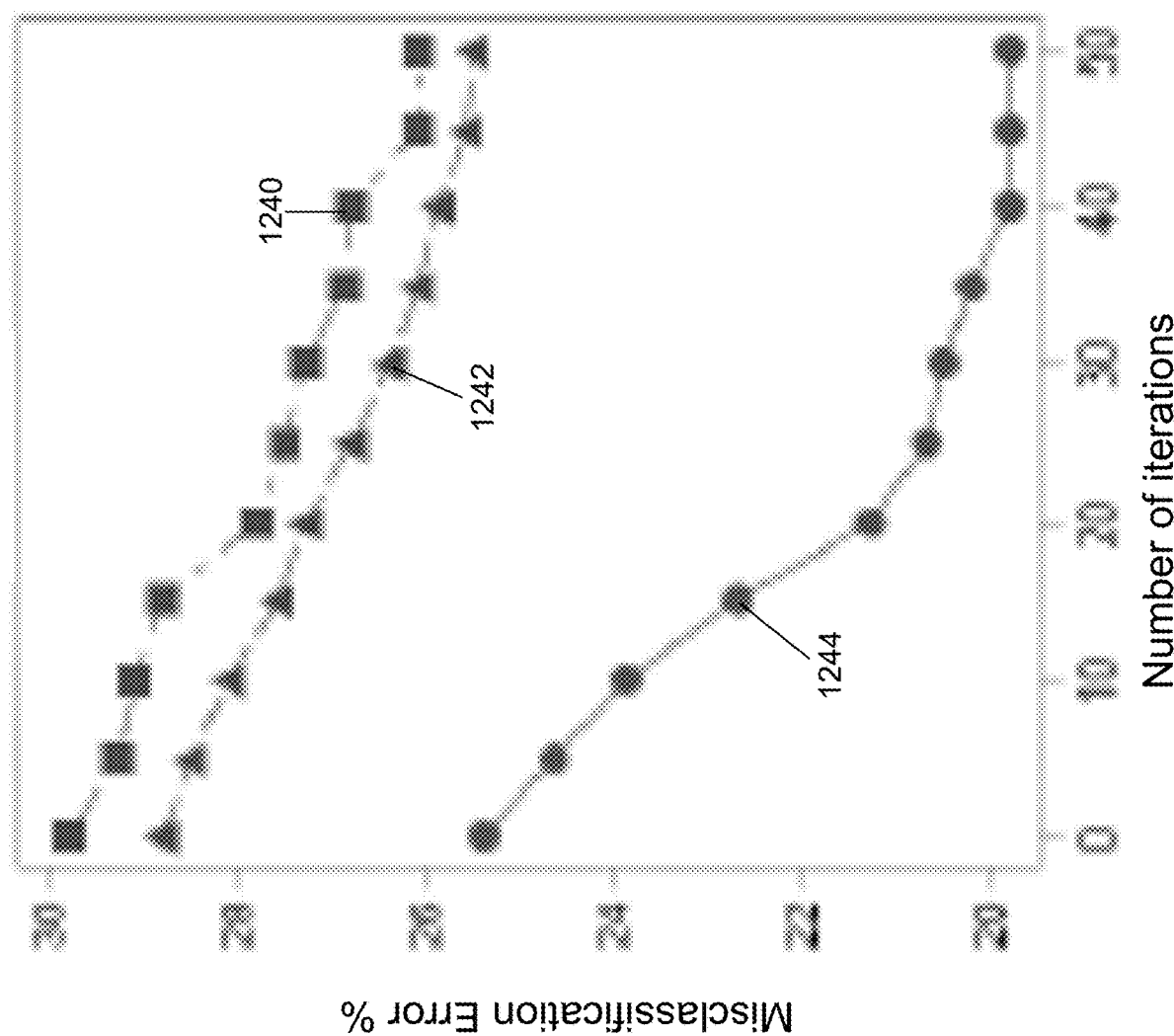

Referring to FIG. 12C, a misclassification error is shown as a function of a number of iterations using the fifth dataset in accordance with an illustrative embodiment. A misclassification error curve 1240 shows the misclassification error computed using the Auto-WEKA method. A misclassification error curve 1242 shows the misclassification error computed using the Auto-sklearn method. A misclassification error curve 1244 shows the misclassification error computed using hyperparameter selection system 100. Misclassification error curve 1244 shows that hyperparameter selection system 100 provides a significantly lower error after just one iteration.

To further evaluate the performance of hyperparameter selection system 100 with real world data, 20 variations of each ECG signal were generated by adding Gaussian noise with zero mean and variance ranging from 0.1 to 0.5 at intervals of 0.1. For each level of variance, four samples were generated. The augmented data set contains 2,185,920 samples in total. Precision-recall curves generated by hyperparameter selection system 100 were compared with other methods including the USDM method, the AER method, the Auto-WEKA method, the Auto-sklearn method, and the ASSL method on the classes S, V, F and Q.

Figure 13:
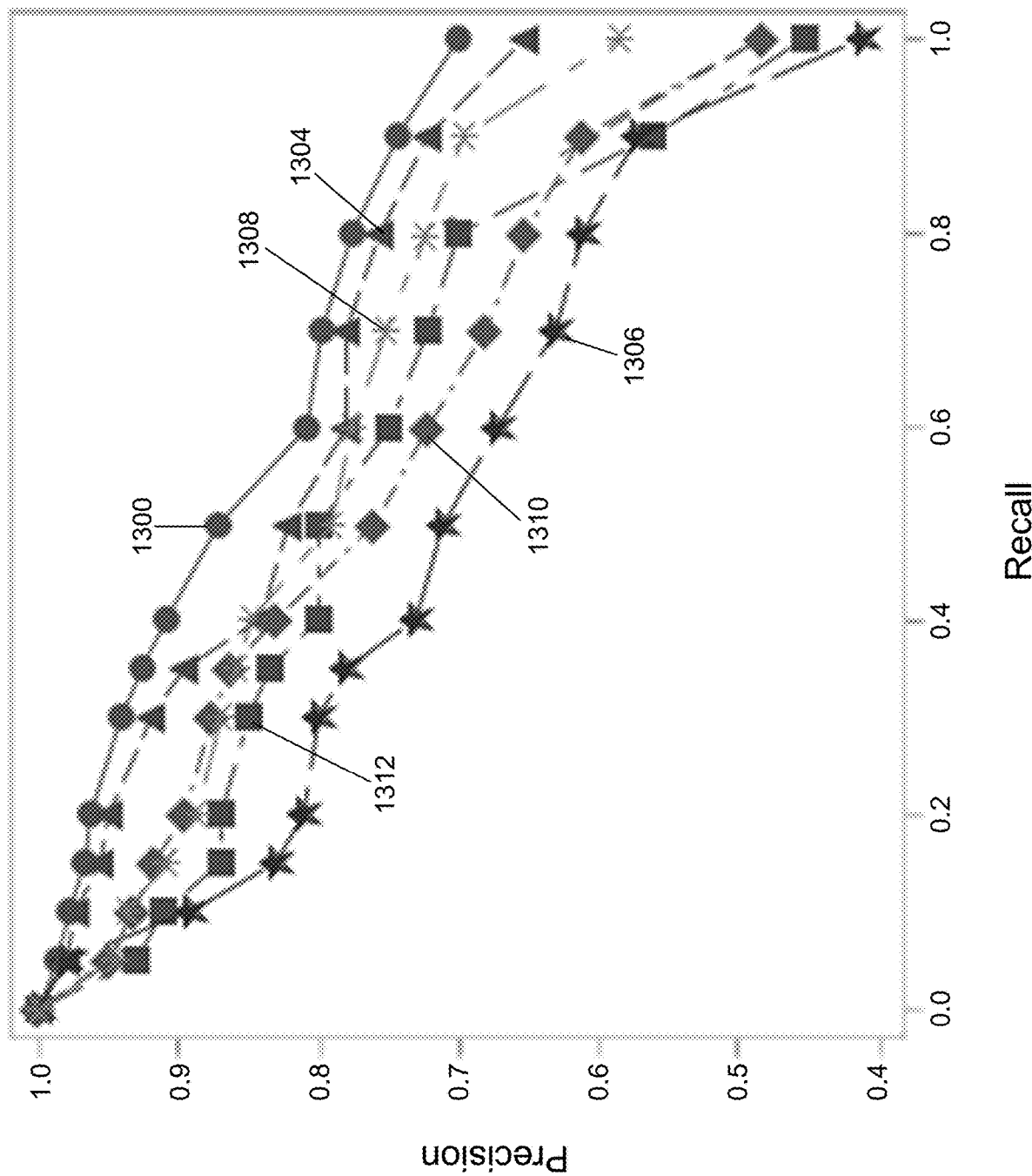
FIGS. 13, 14, 15, and 16 provide precision versus recall comparisons between multiple classification methods using a sixth dataset for four different classes in accordance with an illustrative embodiment.

Referring to FIG. 13, precision versus recall comparisons for a first class "S" of a sixth dataset are shown in accordance with an illustrative embodiment. The sixth dataset includes a real word ECG heart beat categorization dataset with five classes including 109,446 observation vectors, where a class "N" is a majority class representing normal heartbeats and the remaining four classes designated as "S", "V", "F", and "Q" are various types of abnormal heartbeats. Each heartbeat signal includes 188 dimensions. A precision curve 1300 shows the precision versus recall computed using hyperparameter selection system 100. A precision curve 1304 shows the precision versus recall computed using the Auto-sklearn method. A precision curve 1306 shows the precision versus recall computed using the Auto-WEKA method. A precision curve 1308 shows the precision versus recall computed using the ASSL method. A precision curve 1310 shows the precision versus recall computed using the AER method. A precision curve 1312 shows the precision versus recall computed using the USDM method. Precision curve 1300 shows a consistently better precision as a function of recall.

Figure 14:
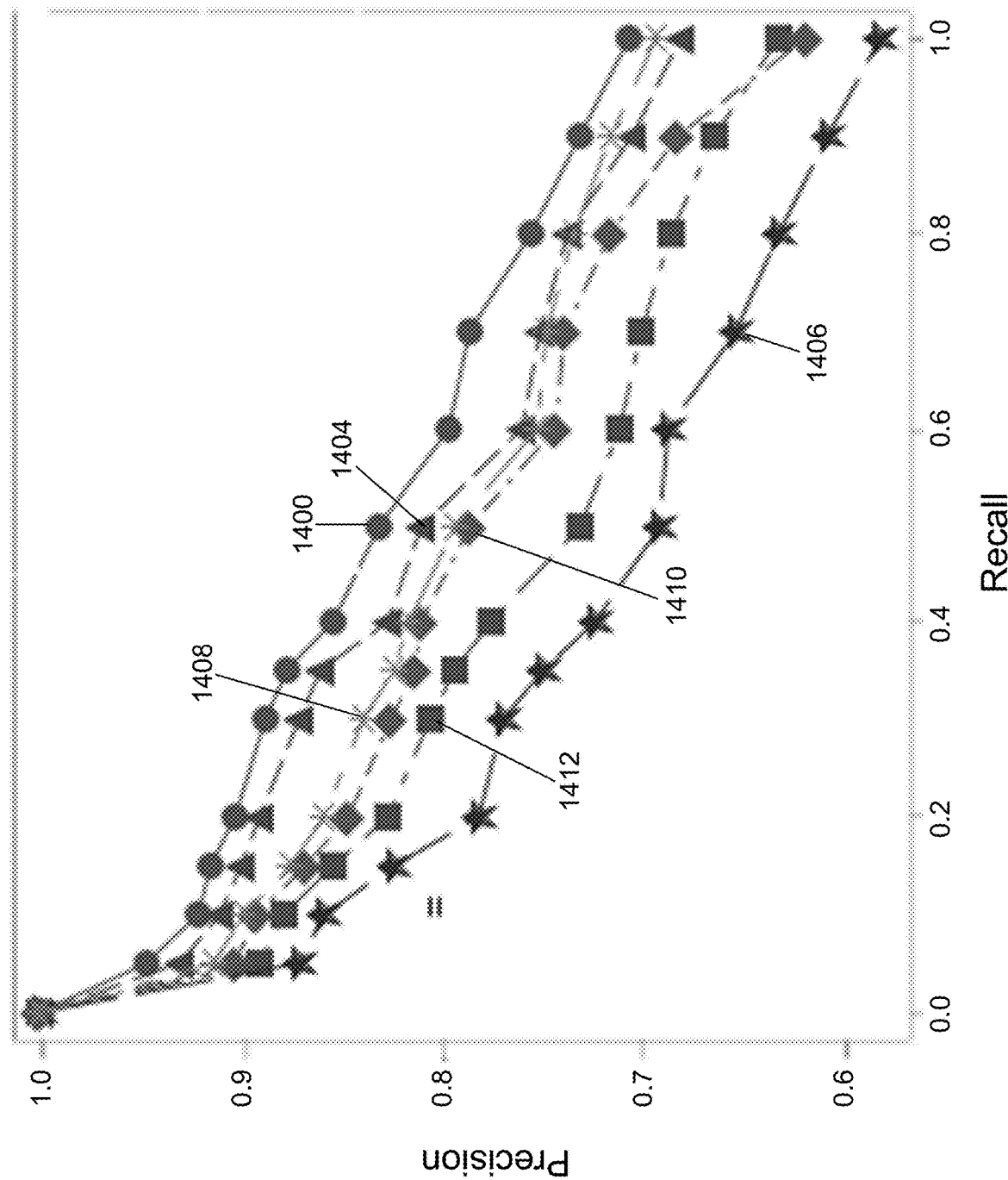

Referring to FIG. 14, precision versus recall comparisons for a second class "V" of the sixth dataset are shown in accordance with an illustrative embodiment. A precision curve 1400 shows the precision versus recall computed using hyperparameter selection system 100. A precision curve 1404 shows the precision versus recall computed using the Auto-sklearn method. A precision curve 1406 shows the precision versus recall computed using the Auto-WEKA method. A precision curve 1408 shows the precision versus recall computed using the ASSL method. A precision curve 1410 shows the precision versus recall computed using the AER method. A precision curve 1412 shows the precision versus recall computed using the USDM method. Precision curve 1400 shows a consistently better precision as a function of recall.

Figure 15:
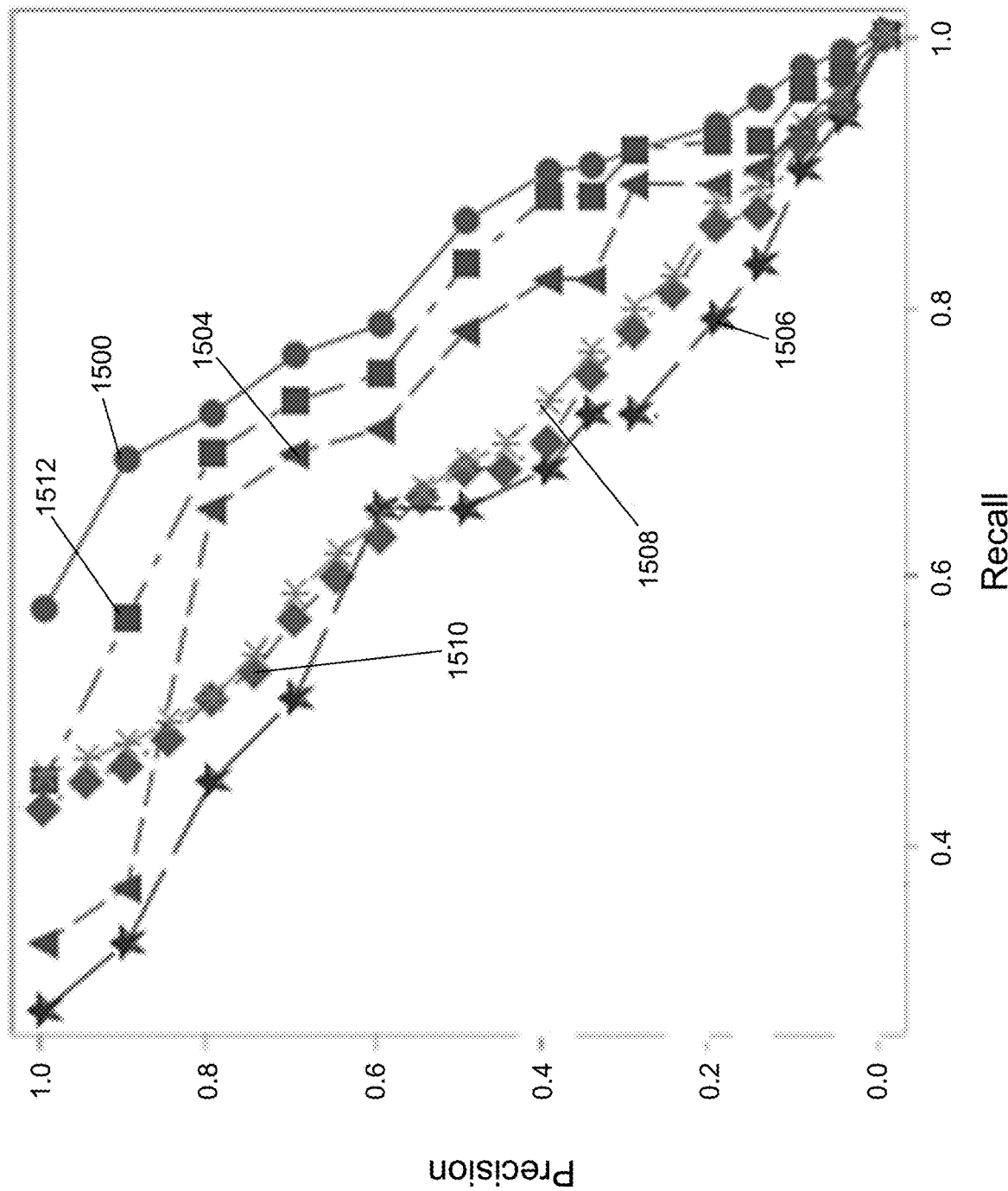

Referring to FIG. 15, precision versus recall comparisons for a third class "F" of the sixth dataset are shown in accordance with an illustrative embodiment. A precision curve 1500 shows the precision versus recall computed using hyperparameter selection system 100. A precision curve 1504 shows the precision versus recall computed using the Auto-sklearn method. A precision curve 1506 shows the precision versus recall computed using the Auto-WEKA method. A precision curve 1508 shows the precision versus recall computed using the ASSL method. A precision curve 1510 shows the precision versus recall computed using the AER method. A precision curve 1512 shows the precision versus recall computed using the USDM method. Precision curve 1500 shows a consistently better precision as a function of recall.

Figure 16:
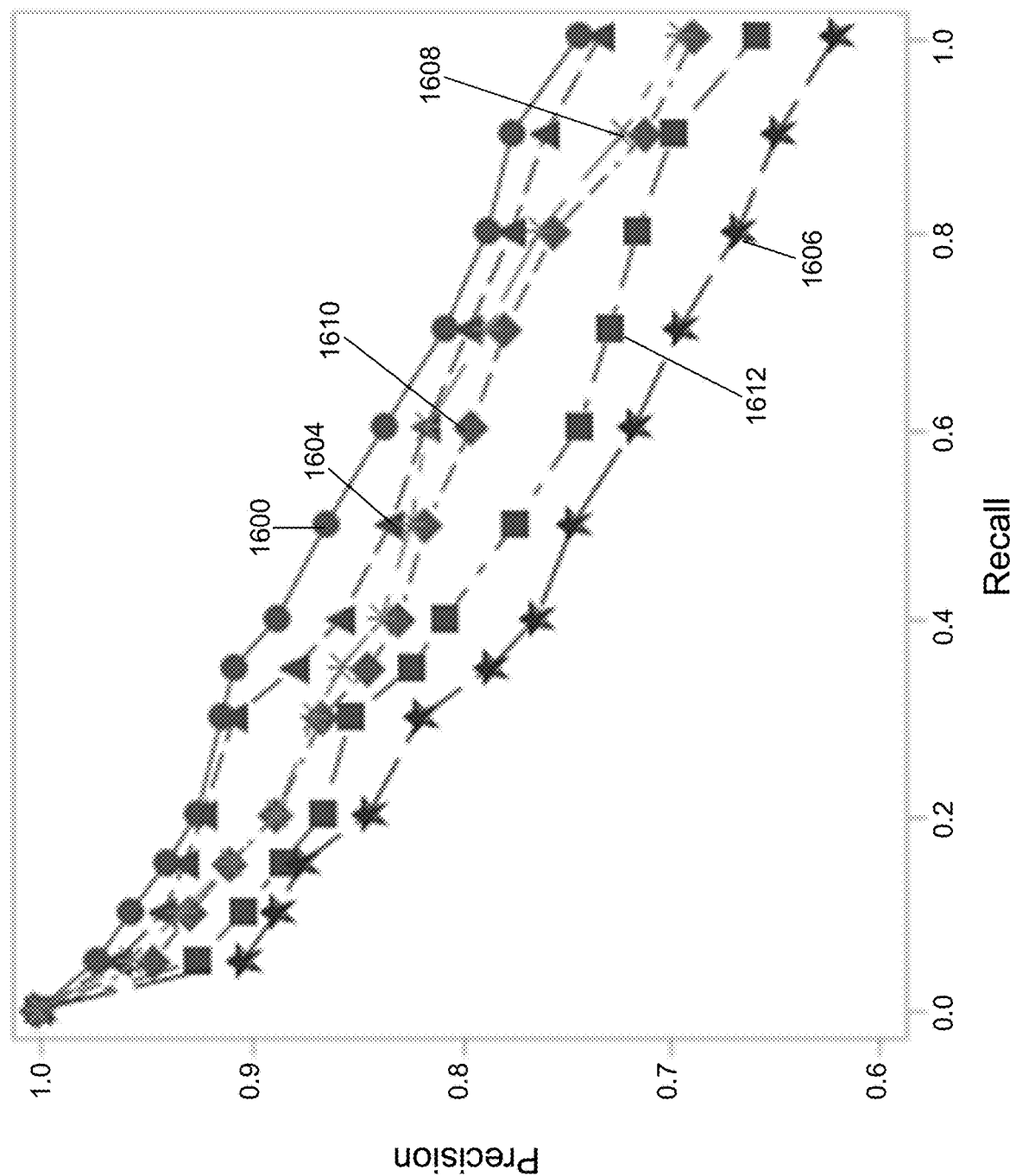

Referring to FIG. 16, precision versus recall comparisons for a fourth class "Q" of the sixth dataset are shown in accordance with an illustrative embodiment. A precision curve 1600 shows the precision versus recall computed using hyperparameter selection system 100. A precision curve 1604 shows the precision versus recall computed using the Auto-sklearn method. A precision curve 1606 shows the precision versus recall computed using the Auto-WEKA method. A precision curve 1608 shows the precision versus recall computed using the ASSL method. A precision curve 1610 shows the precision versus recall computed using the AER method. A precision curve 1612 shows the precision versus recall computed using the USDM method. Precision curve 1600 shows a consistently better precision as a function of recall.

Hyperparameter selection system 100 achieved the best performance for all classes in terms of area under the curve, demonstrating the superiority of hyperparameter selection system 100 for classification of big data with an imbalanced dataset.

Figure 17:
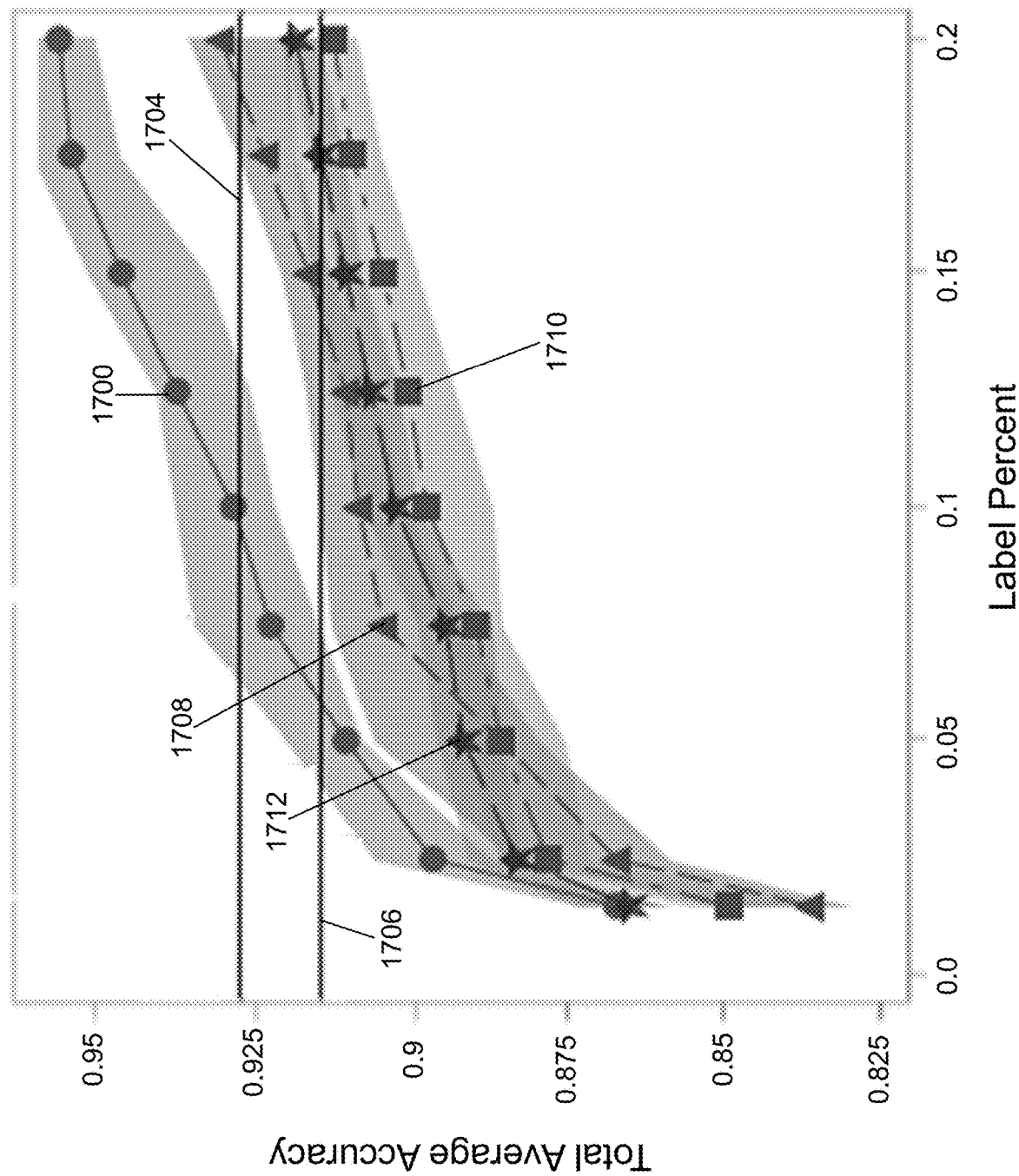
FIG. 17 provides a total average accuracy comparison as a function of a classification percentage between multiple classification methods using the sixth dataset in accordance with an illustrative embodiment.

Referring to FIG. 17, a total average accuracy comparison using the sixth dataset is shown in accordance with an illustrative embodiment. A total average accuracy curve 1700 shows the total average accuracy computed using hyperparameter selection system 100. A total average accuracy curve 1704 shows the total average accuracy computed using the Auto-sklearn method. A total average accuracy curve 1706 shows the total average accuracy computed using the Auto-WEKA method. A total average accuracy curve 1708 shows the total average accuracy computed using the ASSL method. A total average accuracy curve 1710 shows the total average accuracy computed using the AER method. A total average accuracy curve 1712 shows the total average accuracy computed using the USDM method. Total average accuracy curve 1700 shows a consistently better accuracy than any other method with greater than a 3% performance margin.

Figure 18:
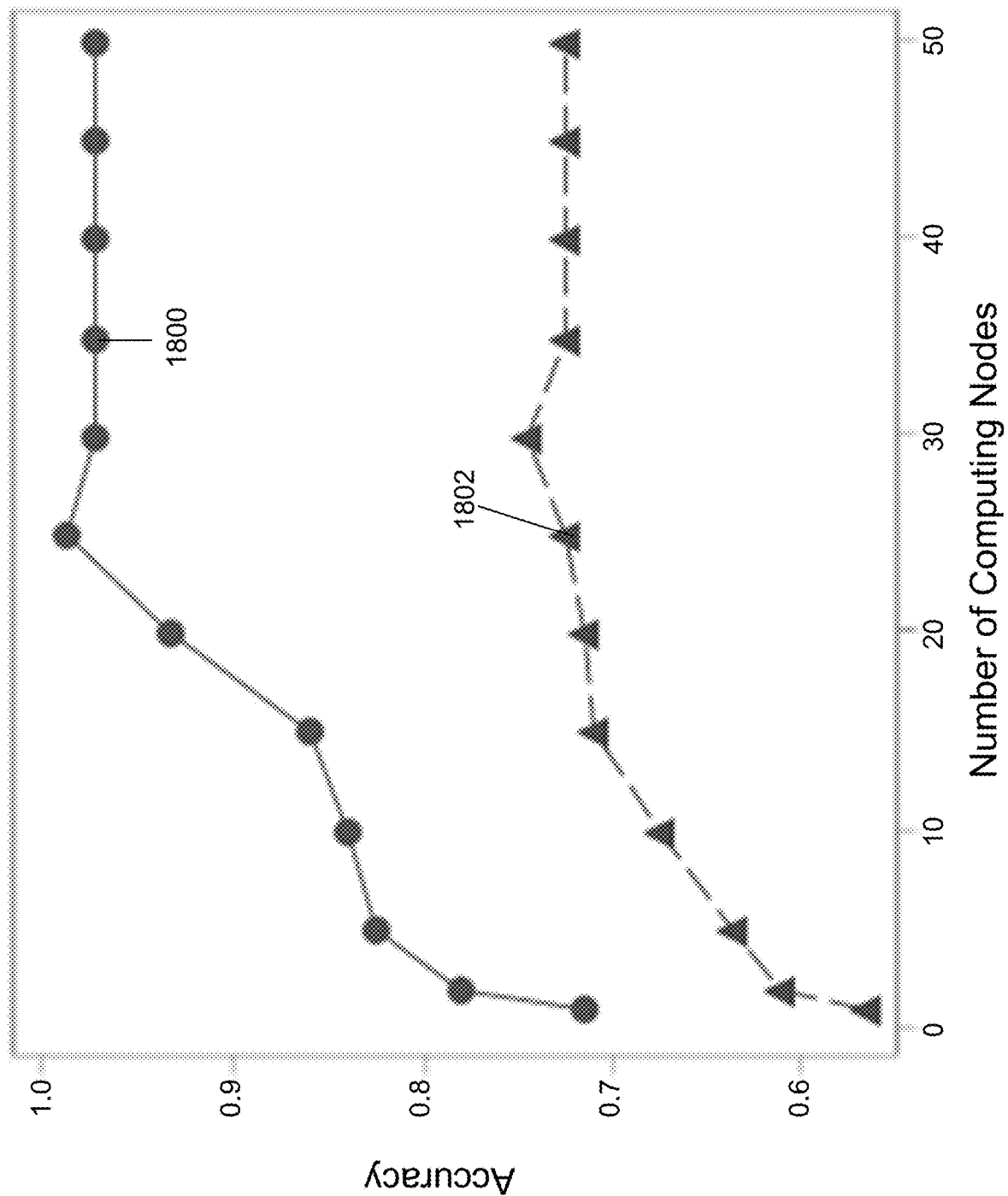
FIG. 18 provides an accuracy comparison as a function of a number of worker computing devices using the sixth dataset in accordance with an illustrative embodiment.

To gain further insight on the impact of the hyperparameters, a detailed study on the performance gain with various components was conducted. Referring to FIG. 18, an accuracy comparison as a function of a number of worker computing devices generated by hyperparameter selection system 100 using the sixth dataset is shown in accordance with an illustrative embodiment. An accuracy curve 1800 shows the accuracy computed using hyperparameter selection system 100. A total average accuracy curve 1802 shows the total average accuracy computed using hyperparameter selection system 100. Both the total accuracy and the average accuracy initially increase with the number of computing nodes and remain stable when the number of machines is greater than 25. This is probably because the percentage of labeled data is higher with increasing nodes resulting in better classification for big data. By tuning the batch size h, a 1.8% performance gain is achieved compared to random selections. The typical range for batch size to achieve the best performance is between 10 and 30. Tuning the kernel bandwidths boosts the total accuracy by 0.7%. A range of 20-50 for s results in good classification performance. Tuning the regularization parameter $\mu$ contributes 0.5% gain in terms of the total classification accuracy, and the best range is 0.7 to 0.8.

Hyperparameter selection system 100 automatically selects optimal values of important hyperparameters including kernel bandwidth, regularization parameters, and batch size, and efficiently solving the combinatorial optimization problems to achieve good classification accuracy. The distributed framework is scalable to big data and achieves a good tradeoff between the classification accuracy and the computational time. Hyperparameter selection system 100 has demonstrated promising classification performance for automated hyperparameter tuning in distributed active learning. The explosion of digital data is generating many opportunities for big data analytics, which in turn provides many opportunities for tuning classification models to capitalize on the information contained in the data—to make better predictions that lead to better decisions. Hyperparameter selection system 100 supports better decision making by providing a system that can identify and evaluate many more hyperparameter configurations in parallel by allocating the computing devices of worker system 106 in an effective data and model parallel manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a first computing device cause the first computing device to:

(A) determine a first loss value based on a converged classification matrix computed using a plurality of observation vectors, wherein the plurality of observation vectors includes a plurality of classified observation vectors and a plurality of unclassified observation vectors, wherein the converged classification matrix defines a label probability for each permissible classification value of a plurality of permissible classification values for each observation vector of the plurality of unclassified observation vectors, wherein the converged classification matrix is defined using a kernel function and a predefined kernel parameter value, wherein each observation vector of the plurality of classified observation vectors has one of the plurality of permissible classification values defined for a target variable;

(B) assign each observation vector of the plurality of observation vectors to a cluster using a clustering algorithm based on the converged classification matrix to define a plurality of clusters;

(C) select a predefined number of observation vectors from each cluster of the defined plurality of clusters based on an entropy value computed for each observation vector of the plurality of unclassified observation vectors, wherein the predefined number of observation vectors is based on a predefined batch size value;

(D) update a copy of the plurality of classified observation vectors to include the observation vectors selected in (C) with a value for the target variable selected based on the label probability of each permissible classification value for each respective selected observation vector;

(E) update a copy of the plurality of unclassified observation vectors to remove the observation vectors selected in (C);

(F) repeat (A) with the updated copy of the plurality of classified observation vectors and the updated copy of the plurality of unclassified observation vectors;

(G) determine an entropy loss value using the entropy value computed for each observation vector selected in (C), wherein (A) to (G) are repeated for a plurality of different values of the predefined kernel parameter value and the predefined batch size value;

(H) determine a second loss value based on the converged classification matrix, a label matrix defined from the converged classification matrix, and a predefined weight value, wherein the label matrix has one of the plurality of permissible classification values defined for the target variable for each observation vector of the updated plurality of unclassified observation vectors;

(I) select a second number of observation vectors from the plurality of unclassified observation vectors, wherein the second number of observation vectors is determined from the different values of the predefined batch size value based on the determined first loss value, the determined entropy loss value, and the determined second loss value;

(J) update the plurality of classified observation vectors to include the observation vectors selected in (I) with the value for the target variable selected based on the label probability of each permissible classification value for each respective observation vector selected in (I);

(K) update the plurality of unclassified observation vectors to remove the observation vectors selected in (I);

(L) repeat (A) to (K) with a plurality of different values of the predefined weight value until convergence is satisfied; and (M) output the label matrix to classify each observation vector included in the plurality of unclassified observation vectors.

2. The non-transitory computer-readable medium of claim 1, wherein the clustering algorithm is a k-means clustering algorithm.

3. The non-transitory computer-readable medium of claim 1, wherein (A) to (G) are performed using a plurality of threads with the plurality of classified observation vectors and a subset of the plurality of unclassified observation vectors distributed to each thread of the plurality of threads, wherein each thread performs (A) to (G) with a different value for at least one of the predefined kernel parameter value, the predefined batch size value, and the predefined weight value.

4. The non-transitory computer-readable medium of claim 1, wherein (A) to (G) are performed using each thread of a plurality of threads of each worker computing device of a plurality of computing devices with the plurality of classified observation vectors and a subset of the plurality of unclassified observation vectors distributed to each thread of the plurality of threads, wherein each thread performs (A) to (G) with a different value for at least one of the predefined kernel parameter value, the predefined batch size value, and the predefined weight value.

5. The non-transitory computer-readable medium of claim 1, wherein computing the converged classification matrix comprises:

computing an affinity matrix using the kernel function with the predefined kernel parameter value, the plurality of classified observation vectors, and the plurality of unclassified observation vectors;

computing a diagonal matrix by summing each row of the computed affinity matrix, wherein the sum of each row is stored in a diagonal of the row with zeroes in remaining positions of the row;

computing a normalized distance matrix using the computed affinity matrix and the computed diagonal matrix; and defining the label matrix using the value of the target variable of each observation vector of the plurality of classified observation vectors.

6. The non-transitory computer-readable medium of claim 5, wherein the label matrix is defined such that $Y_{ig}=1$, if $x_i$ is labeled as $y_i=g$, otherwise, $Y_{ig}=0$, where Y is the label matrix, $x_i$ is an $i^{th}$ observation vector of the plurality of observation vectors, i=1, 2, ..., n, n is a number of the plurality of observation vectors, $y_i$ is the value for the target variable of the $i^{th}$ observation vector, g=1, 2, ..., c, and c is a number of the plurality of permissible classification values.

7. The non-transitory computer-readable medium of claim 6, wherein a classification matrix is initialized as the defined label matrix.

8. The non-transitory computer-readable medium of claim 7, wherein the classification matrix is converged using $F(t+1)=\alpha SF(t)+(1-\alpha)Y$, where $F(t+1)$ is a next classification matrix, a is the predefined weight value, S is the computed, normalized distance matrix, F(t) is the classification matrix, Y is the defined label matrix, and t is an iteration number.

9. The non-transitory computer-readable medium of claim 8, wherein the classification matrix is converged when a predefined number of iterations of computing $F(t+1)=\alpha SF(t)+(1-\alpha)Y$ is complete.

10. The non-transitory computer-readable medium of claim 5, wherein the affinity matrix is computing using $$W_{ij} = \exp\frac{-\|x_i - x_j\|^2}{2s^2} \text{ if } i \neq j \ W_{ii} = 0,$$

where s is the predefined kernel parameter value, $x_i$ is an $i^{th}$ observation vector of the plurality of observation vectors, i=1, ..., n, $x_j$ is a $j^{th}$ observation vector of the plurality of observation vectors, j=1, ..., n, and n is a number of the plurality of observation vectors.

11. The non-transitory computer-readable medium of claim 10, wherein the kernel function is a K nearest neighbors kernel function where only k observation vectors are included in the affinity matrix W such that the included k observation vectors are selected based on having minimum values for exp $$\frac{-\|x_i - x_j\|^2}{2s^2},$$

where k is another predefined kernel parameter value.

12. The non-transitory computer-readable medium of claim 10, wherein the diagonal matrix is computing using $$D_{ii} = \sum_{j=1}^{n} W_{ij} \text{ and } D_{ij} = 0 \text{ if } i \neq j,$$

where W is the computed affinity matrix.

13. The non-transitory computer-readable medium of claim 12, wherein the normalized distance matrix is computed using $S=D^{-1/2}WD^{-1/2}$, where D is the computed diagonal matrix.

14. The non-transitory computer-readable medium of claim 1, wherein the label matrix is defined such that $Y_{ig}=1$, if $x_i$ is labeled as $$y_i = \underset{j \leq c}{\mathrm{argmax}} F_{ij}(t), \ j = 1, 2, \ldots c,$$

otherwise, $Y_{ig}=0$, where Y is the label matrix, $x_i$ is an $i^{th}$ observation vector of the plurality of unclassified observation vectors, i=1, 2, ..., n, n is a number of the plurality of unclassified observation vectors, F(t) is the converged classification matrix, $F_{ij}(t)$ is a probability value of the $i^{th}$ observation vector for a $j^{th}$ class, and c is a number of the plurality of permissible classification values.

15. The non-transitory computer-readable medium of claim 5, wherein the first loss value is computing using $$C_1 = \frac{1}{2}\sum_{i=1}^{n}\sum_{j=1}^{n} W_{i,j} \left\| \frac{1}{\sqrt{D_{i,i}}}F_i - \frac{1}{\sqrt{D_{j,j}}}F_j \right\|^2,$$

where W is the computed affinity matrix, D is the computed diagonal matrix, F is the converged classification matrix, and n is a number of the plurality of observation vectors.

16. The non-transitory computer-readable medium of claim 1, wherein the predefined number of observation vectors selected from each cluster l=[h/c] is a largest integer that is not larger than h/c, where h is the predefined batch size value, and c is a number of the plurality of permissible classification values.

17. The non-transitory computer-readable medium of claim 16, wherein the entropy loss value is computing using $$C_e = -\lambda \sum_{q=1}^{l*c} C_q,$$

where λ is a predefined strength of entropy regularization parameter value, and $C_q$ is the entropy value computed for each observation vector of the predefined number of observation vectors selected from each cluster of the defined plurality of clusters that have maximum entropy values.

18. The non-transitory computer-readable medium of claim 5, wherein the second loss value is computing using $$C_2 = \frac{\mu}{2}\sum_{i=1}^{n} \|F_i - Y_i\|^2$$

where $$\mu = \frac{1}{\alpha^o} - 1,$$

is a weight value selected from the plurality of different values of the predefined weight value, F is the converged classification matrix, Y is the label matrix, and n is a number of the plurality of observation vectors.

19. The non-transitory computer-readable medium of claim 18, wherein the selected weight value is associated with an extremum value of a combination of the determined first loss value and the determined entropy loss value.

20. The non-transitory computer-readable medium of claim 19, wherein the extremum value is a minimum of a sum of the determined first loss value and the determined entropy loss value.

21. The non-transitory computer-readable medium of claim 1, wherein the determined second number of observation vectors is the predefined batch size value associated with an extremum value of a combination of the determined first loss value, the determined entropy loss value, and the determined second loss value.

22. The non-transitory computer-readable medium of claim 21, wherein the extremum value is a minimum of a sum of the determined first loss value, the determined entropy loss value, and the determined second loss value.

23. The non-transitory computer-readable medium of claim 1, wherein the output label matrix is associated with an extremum value of a combination of the determined first loss value, the determined entropy loss value, and the determined second loss value.

24. The non-transitory computer-readable medium of claim 23, wherein the extremum value is a minimum of a sum of the determined first loss value, the determined entropy loss value, and the determined second loss value.

25. The non-transitory computer-readable medium of claim 1, wherein the predefined batch size value, the predefined weight value, and the predefined kernel parameter value associated with an extremum value of a combination of the determined first loss value, the determined entropy loss value, and the determined second loss value are further output to define an optimum hyperparameter configuration.

26. The non-transitory computer-readable medium of claim 1, comprising computer-readable instructions that further cause the first computing device to train a predictive model with the output label matrix and the plurality of observation vectors.

27. The non-transitory computer-readable medium of claim 1, wherein a number of the plurality of clusters is a number of the plurality of permissible classification values.

28. The non-transitory computer-readable medium of claim 1, wherein the value for the target variable selected for each observation vector of the plurality of unclassified observation vectors identifies a characteristic of a respective observation vector.

29. A computing device comprising:
a processor; and
a computer-readable medium operably coupled to the processor, the computer-readable medium having computer-readable instructions stored thereon that, when executed by the processor, cause the computing device to
(A) determine a first loss value based on a converged classification matrix computed using a plurality of observation vectors, wherein the plurality of observation vectors includes a plurality of classified observation vectors and a plurality of unclassified observation vectors, wherein the converged classification matrix defines a label probability for each permissible classification value of a plurality of permissible classification values for each observation vector of the plurality of unclassified observation vectors, wherein the converged classification matrix is defined using a kernel function and a predefined kernel parameter value, wherein each observation vector of the plurality of classified observation vectors has one of the plurality of permissible classification values defined for a target variable;
(B) assign each observation vector of the plurality of observation vectors to a cluster using a clustering algorithm based on the converged classification matrix to define a plurality of clusters;
(C) select a predefined number of observation vectors from each cluster of the defined plurality of clusters based on an entropy value computed for each observation vector of the plurality of unclassified observation vectors, wherein the predefined number of observation vectors is based on a predefined batch size value;
(D) update a copy of the plurality of classified observation vectors to include the observation vectors selected in (C) with a value for the target variable selected based on the label probability of each permissible classification value for each respective selected observation vector;
(E) update a copy of the plurality of unclassified observation vectors to remove the observation vectors selected in (C);
(F) repeat (A) with the updated copy of the plurality of classified observation vectors and the updated copy of the plurality of unclassified observation vectors;
(G) determine an entropy loss value using the entropy value computed for each observation vector selected in (C), wherein (A) to (G) are repeated for a plurality of different values of the predefined kernel parameter value and the predefined batch size value;
(H) determine a second loss value based on the converged classification matrix, a label matrix defined from the converged classification matrix, and a predefined weight value, wherein the label matrix has one of the plurality of permissible classification values defined for the target variable for each observation vector of the updated plurality of unclassified observation vectors;
(I) select a second number of observation vectors from the plurality of unclassified observation vectors, wherein the second number of observation vectors is determined from the different values of the predefined batch size value based on the determined first loss value, the determined entropy loss value, and the determined second loss value;
(J) update the plurality of classified observation vectors to include the observation vectors selected in (I) with the value for the target variable selected based on the label probability of each permissible classification value for each respective observation vector selected in (I);
(K) update the plurality of unclassified observation vectors to remove the observation vectors selected in (I);
(L) repeat (A) to (K) with a plurality of different values of the predefined weight value until convergence is satisfied; and
(M) output the label matrix to classify each observation vector included in the plurality of unclassified observation vectors.

30. A method of classifying data using automatically selected hyperparameter values, the method comprising:
(A) determining, by a computing device, a first loss value based on a converged classification matrix computed using a plurality of observation vectors, wherein the plurality of observation vectors includes a plurality of classified observation vectors and a plurality of unclassified observation vectors, wherein the converged classification matrix defines a label probability for each permissible classification value of a plurality of permissible classification values for each observation vector of the plurality of unclassified observation vectors, wherein the converged classification matrix is defined using a kernel function and a predefined kernel parameter value, wherein each observation vector of the plurality of classified observation vectors has one of the plurality of permissible classification values defined for a target variable;

(B) assigning, by the computing device, each observation vector of the plurality of observation vectors to a cluster using a clustering algorithm based on the converged classification matrix to define a plurality of clusters;

(C) selecting, by the computing device, a predefined number of observation vectors from each cluster of the defined plurality of clusters based on an entropy value computed for each observation vector of the plurality of unclassified observation vectors, wherein the predefined number of observation vectors is based on a predefined batch size value;

(D) updating, by the computing device, a copy of the plurality of classified observation vectors to include the observation vectors selected in (C) with a value for the target variable selected based on the label probability of each permissible classification value for each respective selected observation vector;

(E) updating, by the computing device, a copy of the plurality of unclassified observation vectors to remove the observation vectors selected in (C);

(F) repeating, by the computing device, (A) with the updated copy of the plurality of classified observation vectors and the updated copy of the plurality of unclassified observation vectors;

(G) determining, by the computing device, an entropy loss value using the entropy value computed for each observation vector selected in (C), wherein (A) to (G) are repeated for a plurality of different values of the predefined kernel parameter value and the predefined batch size value;

(H) determining, by the computing device, a second loss value based on the converged classification matrix, a label matrix defined from the converged classification matrix, and a predefined weight value, wherein the label matrix has one of the plurality of permissible classification values defined for the target variable for each observation vector of the updated plurality of unclassified observation vectors;

(I) selecting, by the computing device, a second number of observation vectors from the plurality of unclassified observation vectors, wherein the second number of observation vectors is determined from the different values of the predefined batch size value based on the determined first loss value, the determined entropy loss value, and the determined second loss value;

(J) updating, by the computing device, the plurality of classified observation vectors to include the observation vectors selected in (I) with the value for the target variable selected based on the label probability of each permissible classification value for each respective observation vector selected in (I);

(K) updating, by the computing device, the plurality of unclassified observation vectors to remove the observation vectors selected in (I);

(L) repeating, by the computing device, (A) to (K) with a plurality of different values of the predefined weight value until convergence is satisfied; and (M) outputting, by the computing device, the label matrix to classify each observation vector included in the plurality of unclassified observation vectors.

* * * * *

UNITED STATES PATENT AND TRADEMARK OFFICE
CERTIFICATE OF CORRECTION

PATENT NO. : 10,832,174 B1
APPLICATION NO. : 16/816382
DATED : November 10, 2020
INVENTOR(S) : Xu Chen et al.

It is certified that error appears in the above-identified patent and that said Letters Patent is hereby corrected as shown below:

In the Specification

Column 26, Lines 18-19:
Delete the phrase "$[s_p{}^o, k_p{}^o, h_p{}^o, a_p{}^o]$, where $[s_p{}^o, k_p{}^o, h_p{}^o, a_p{}^o]$" and replace with --$[s_p^o, k_p^o, h_p^o, \alpha_p^o]$, where $[s_p^o, k_p^o, h_p^o, \alpha_p^o]$--.

Column 26, Line 30:
Delete the phrase "$[s_p{}^o, h_p{}^o, k_p{}^o, \mu_p{}^o]$" and replace with --$[s_p^o, h_p^o, k_p^o, \mu_p^o]$--.

Column 26, Line 31:
Delete the phrase "$[s_p{}^o, k_p{}^o, h_p{}^o, a_p{}^o]$" and replace with --$[s_p^o, k_p^o, h_p^o, \alpha_p^o]$--.

Column 28, Lines 50-51:
Delete the phrase "where a is defined" and replace with --where α is defined--.

Column 29, Line 50:
Delete the phrase "$C = -\sum_{j=1}^{c} F_{ij}(t+1)\log(F_{ij}(T+1)), i = 1, \ldots, n$," and replace with --$C = -\sum_{j=1}^{c} F_{ij}(t+1)\log(F_{ij}(t+1)), i = 1, \ldots, n$--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*